(12) United States Patent
Gambahaya

(10) Patent No.: US 10,756,441 B2
(45) Date of Patent: Aug. 25, 2020

(54) RADAR LENS ANTENNA ARRAYS AND METHODS

(71) Applicant: TAOGLAS GROUP HOLDINGS LIMITED, Enniscorthy, County Wexford (IE)

(72) Inventor: Sifiso Gambahaya, Wexford (IE)

(73) Assignee: TAOGLAS GROUP HOLDINGS LIMITED, Enniscorthy, County Wexford (IE)

( * ) Notice: Subject to any disclaimer, the term of this patent is extended or adjusted under 35 U.S.C. 154(b) by 0 days.

(21) Appl. No.: 15/901,181

(22) Filed: Feb. 21, 2018

(65) Prior Publication Data

US 2018/0241132 A1 Aug. 23, 2018

Related U.S. Application Data

(60) Provisional application No. 62/461,549, filed on Feb. 21, 2017.

(51) Int. Cl.
| | |
|---|---|
| *H01Q 19/06* | (2006.01) |
| *H01Q 15/08* | (2006.01) |
| *H01Q 3/26* | (2006.01) |
| *H01Q 17/00* | (2006.01) |
| *H01Q 3/40* | (2006.01) |
| *G01S 7/03* | (2006.01) |

(Continued)

(52) U.S. Cl.
CPC .......... *H01Q 19/065* (2013.01); *G01S 7/03* (2013.01); *G01S 13/931* (2013.01); *H01Q 1/1207* (2013.01); *H01Q 3/2617* (2013.01); *H01Q 3/40* (2013.01); *H01Q 9/0414* (2013.01); *H01Q 15/08* (2013.01); *H01Q 17/001* (2013.01); *H01Q 19/062* (2013.01); *G01S 7/2813* (2013.01); *G01S 13/426* (2013.01)

(58) Field of Classification Search
CPC .... H01Q 19/065; H01Q 19/062; H01Q 15/08; H01Q 3/2617; H01Q 17/001; H01Q 1/1207; H01Q 3/40; H01Q 9/0414; H01Q 1/3233
See application file for complete search history.

(56) References Cited

U.S. PATENT DOCUMENTS

| | | | |
|---|---|---|---|
| 6,441,368 B1 * | 8/2002 | Grinberg | G01J 5/08 250/216 |
| 9,866,259 B1 | 1/2018 | Margomenos | |

(Continued)

OTHER PUBLICATIONS

Ala-Laurinaho, et al.,"2-D Beam-Steerable Integrated Lens antenna system for 5G E-Band Access and Backhaul", IEEE Transactions on Microwave Theory and Techniques, Jul. 2016, pp. 2244-2255, vol. 64, No. 7.

(Continued)

*Primary Examiner* — Hoang V Nguyen
(74) *Attorney, Agent, or Firm* — Knobbe, Martens, Olson & Bear LLP

(57) ABSTRACT

Disclosed are multiple-input, multiple-output (MIMO) antenna systems with high gain having an impedance bandwidth greater than 1 GHz and high side-lobe rejection. Suitable systems are configurable to have a radar lens with, for example, an 8×1 antenna array. Additionally, beam steering architecture that concentrates radiated energy through a dielectric lens to achieve a narrow high-gain beam.

23 Claims, 31 Drawing Sheets

(51) Int. Cl.
*H01Q 1/12* (2006.01)
*G01S 13/931* (2020.01)
*H01Q 9/04* (2006.01)
*G01S 13/42* (2006.01)
*G01S 7/28* (2006.01)

(56) References Cited

U.S. PATENT DOCUMENTS

| | | | | |
|---|---|---|---|---|
| 2003/0201930 | A1* | 10/2003 | Nagasaku | G01S 7/032 |
| | | | | 342/175 |
| 2006/0139206 | A1* | 6/2006 | Nagasaku | G01S 7/032 |
| | | | | 342/104 |
| 2012/0249388 | A1* | 10/2012 | Hansen | H01Q 1/2266 |
| | | | | 343/753 |
| 2015/0198777 | A1* | 7/2015 | Yan | G02B 7/021 |
| | | | | 359/793 |
| 2015/0207236 | A1* | 7/2015 | Felic | H01Q 1/3233 |
| | | | | 343/753 |
| 2017/0018857 | A1 | 1/2017 | Lo et al. | |
| 2017/0194720 | A1 | 7/2017 | Duan et al. | |
| 2017/0271762 | A1 | 9/2017 | Ko et al. | |
| 2017/0324171 | A1 | 11/2017 | Shehan | |
| 2018/0026335 | A1 | 1/2018 | Lee et al. | |

OTHER PUBLICATIONS

Heath, Jr., "Millimeter Wave for 5G Features and Implications," 2015, Wireless Networking and Communications Group, Department of Electrical and Computer Engineering,The University of Texas at Austin.

Rebeiz, et al., "Millimeter-Wave Large-Scale Phased-Arrays for 5G Systems," IEEE Microwave Symposium, May 22, 2015, University of California San Diego, La Jolla, CA.

Saada, "Design of Efficient Millimeter Wave Planar Antennas for 5G Communication Systems", Apr. 2017, the Islamic University—Gaza, Research and Postgrraduate Affairs, Faculty of Engineering, Master of Electrical Engineering, Communications Systems.

* cited by examiner

| STANDARD | RADIO FREQUENCY | RADAR |
|---|---|---|
| FREQUENCY (GHz) | | 76-77 GHz |
| MAX VSWR | | 2:1 |
| MAX RETURN LOSS (dB) | | 10 |
| PEAK GAIN (dBi) | | 30 dBi |
| EFFICIENCY (%) | | +90% |
| RADIATION PROPERTIES | | DIRECTIONAL |
| POLARIZATION | | LINEAR |
| IMPEDANCE | | 50 Ω |
| | MECHANICAL | |
| DIMENSIONS (mm) | | 26.5 X17.254X25.88 mm |
| MATERIAL | | GLASS FIBER REINFORCED PTFEx LAMINATE |
| CONNECTOR INTERFACE | | WR10 WAVEGUIDE WITH UG 387/U-M FLANGE OR DIRECT ETCHING INTO RF CHIPS |
| | ENVIRONMENTAL | |
| OPERATION TEMPERATURE | | -40°C TO 85°C |
| STORAGE TEMPERATURE | | -40°C TO 85°C |
| RELATIVE HUMIDITY | | 40% TO 95% |
| RoHS COMPLIANT | | YES |

FIG. 1

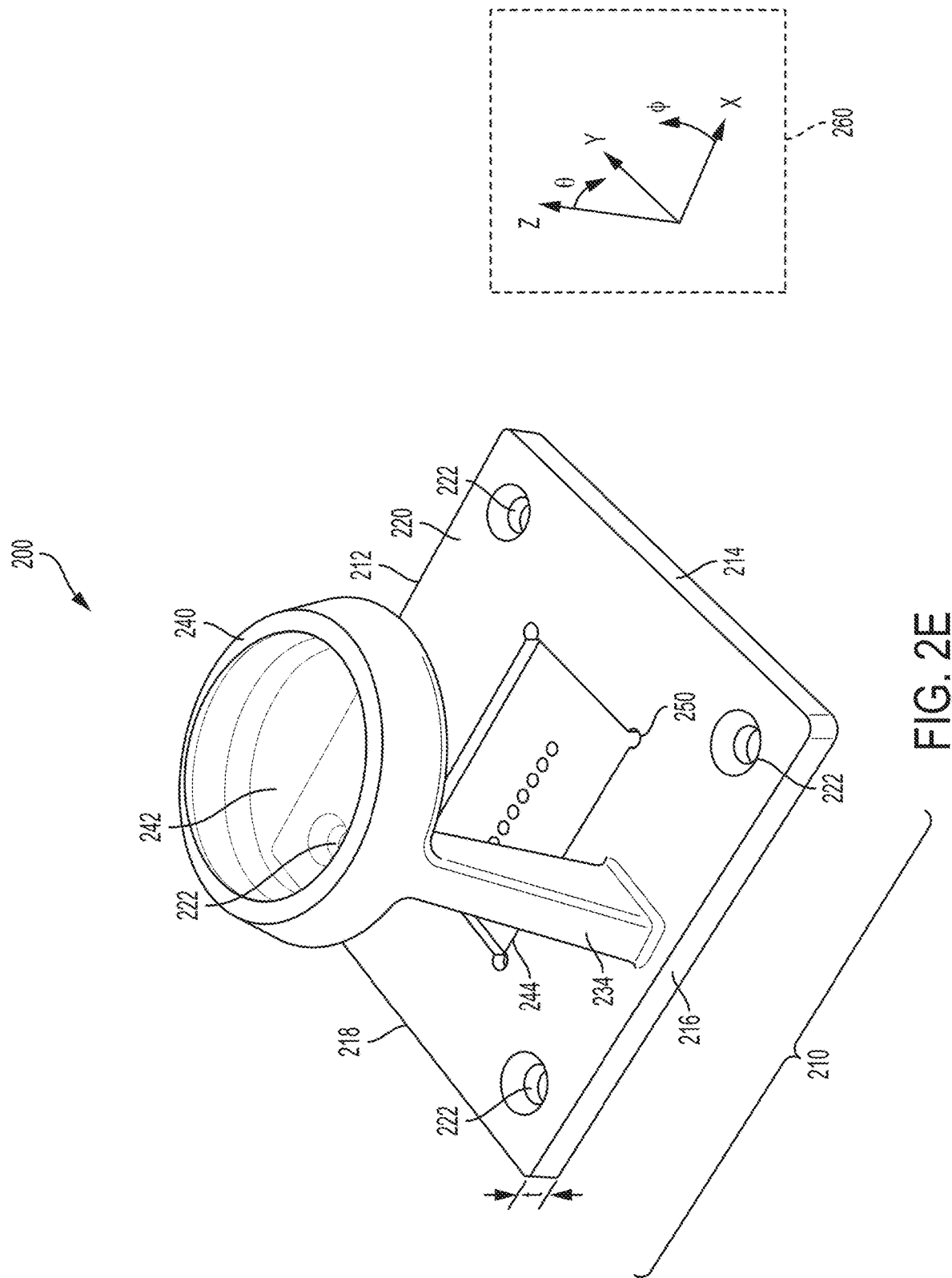

RADAR LENS ANTENNA ARRAYS AND METHODS

CROSS-REFERENCE

This application claims the benefit of U.S. Provisional Application No. 62/461,549, filed Feb. 21, 2017, entitled 77 GHz Radar Lens 8×1 Antenna Array, which application is incorporated herein by reference.

BACKGROUND

Field

The present disclosure relates in general to an antenna and, in particular, to a multiple-input, multiple-output antenna array.

Background 5G wireless networks will support 1,000-fold gains in capacity, connections for at least 100 billion devices, and a 10 GB/s individual user experience capable of extremely low latency and response times. The 5G networks (5th generation mobile networks or wireless systems) operate in the millimeter wavebands 28 GHz, 38 GHz and 60 GHz. 5 G planning aims at higher capacity than current 4G networks by allowing a higher density of mobile broadband users and supporting device-to-device communications more reliability with lower latency and lower battery consumption.

Deployment of these 5G networks are projected to begin circa 2020. 5G radio access will be built upon both new radio access technologies and evolved existing wireless technologies. In particular, substantial research and development effort is being directed toward mm wave frequency band (>30 GHz) technologies for numerous applications, including automotive radar.

To address emerging 5G requirements, what is needed is a multiple-input multiple-output antenna system with high gain (approximately 20 dBi), impedance bandwidth greater than 1 GHz, and high side lobe rejection. Additional benefits would be realized if such an antenna system offered robust communications as well as high precision and excellent scalability from short- to long-range radar.

SUMMARY

Disclosed is a radar lens antenna array suitable for 5G millimeter wavelength communications with multiple-input multiple-output (MIMO) functionality. The antenna array can be an 8×1 array and configurable to operate at, for example, 77 GHz. However the disclosed radar lens antenna array can be scaled to provide more or fewer antenna elements and/or to operate at any frequency.

Beam-steering architecture concentrates radiated energy through a dielectric lens to achieving a narrow high gain beam. The collimating lens provides high side lobe rejection.

The antenna array may feed the radio frequency chipsets directly or via a microstrip-to-waveguide transition.

Eight antenna ports enable simultaneous multiple beams with a field-of-view of +/−15°, high gain (approximately 20 dBi) as well as impedance bandwidth in excess of 1 GHz.

An aspect of the disclosure is directed to antenna systems. Suitable antenna systems comprise: a base having an upper surface and a lower surface further comprising an antenna receptacle, a support leg extending from an upper surface of the base, and a lens holder wherein the support leg positions the lens holder away from the upper surface of the base; a lens configurable to concentrate a radiated energy through the lens; and an antenna array positioned in the antenna receptacle below the lens. The antenna systems can further comprise one or more additional support legs. The support leg can cantilever the lens over the antenna array. Additionally, the lens holder can be a bevel, or each support leg can have a corresponding prong element that secures the lens. A rail can be provided upon which the lens sits. The rail can be sized to accommodate the entire circumference of the lens, In at least some configurations, the antenna array is configurable to have a plurality of antennas and a plurality of ports. The plurality of antenna elements, can be, for example eight antennas. The radiated energy can be an electromagnetic energy at frequencies of, for example, from 75 GHz to 80 GHz. The radiated energy can be concentrated with high side lobe rejection. Multiple beams can be provided with a field view of +/−15 degrees are allowed. The base can have a shape in two dimensions selected from square, round, rectangular, ovoid, and triangular. Other shapes can be employed which accommodate the installation environment. The lens can have a focal distance of about 19 mm from a surface of the antenna array. The lens diameter and focal distance can increase or decrease depending on the array and the antenna size and/or the frequency of the antenna.

Another aspect of the disclosure is directed to methods of concentrating radiated energy. Suitable methods comprise: providing a base having an upper surface and a lower surface and further comprising an antenna receptacle, and a support leg extending from an upper surface of the base; positioning a lens in a lens holder away from the upper surface of the base; concentrating a radiated energy through the lens. The base is further configurable to comprise one or more additional support legs. In some configurations, the lens holder is a bevel. Additionally, the antenna array is configurable to have a plurality of antennas and a plurality of ports. In some configurations, the plurality of antenna elements are eight antennas. Additionally, the methods can include the step of radiating energy at frequencies of from 75 GHz to 80 GHz. Multiple beams with a field view of +/−15 degrees are also allowed. Radiated energy can be concentrated with high side lobe rejection. Additionally, the base has a shape in two dimensions selected from square, round, rectangular, ovoid, and triangular. The step of positioning the lens in the lens holder away from the receiving surface of the base can further comprise positioning the lens with a focal distance of about 19 mm from a surface of the antenna array. Other focal distances can be used without departing from the scope of the disclosure.

Still another aspect of the disclosure is directed to antenna arrays comprising: an antenna substrate; a plurality of planar antenna elements wherein the plurality of antenna elements further comprises four sides with two notches along a first side of the planar antenna element and a connector tab extending from between the two notches along the first side of the planar antenna element; and a plurality of ports. In some configurations, the plurality of planar antenna elements is eight and the plurality of ports is eight. Additionally, the antenna array radiates energy at frequencies of from 75 GHz to 80 GHz.

INCORPORATION BY REFERENCE

All publications, patents, and patent applications mentioned in this specification are herein incorporated by reference to the same extent as if each individual publication, patent, or patent application was specifically and individually indicated to be incorporated by reference:

ALA-LAURINOAHO, et al., "2-D Beam-Steerable Integrated Lens antenna system for 5G E-Band Access and Backhaul", IEEE Transactions on Microwave Theory and Techniques, June 2016;

HEATH, Jr., "Millimeter Wave for 5G Features and Implications," 2015;

REBEIZ, et al., "Millimeter-Wave Large-Scale Phased-Arrays for 5G Systems," IEEE Microwave Symposium, May 22, 2015;

SAADA, "Design of Efficient Millimeter Wave Planar Antennas for 5G Communication Systems", The Islamic University-Gaza, Communication Systems, April 2017;

US 2017/0018857 A1, published Jan. 19, 2017 to Lo et al.;

US 2017/0194720 A1, published Jul. 6, 2017 to Duan et al.;

US 2017/0271762 A1, published Sep. 21, 2017 to Ko et al.;

US 2017/0324171 A1 published Nov. 9, 2017 to Shehan;

US 2018/0026335 A1 published Jan. 25, 2018 to Lee et al.; and

U.S. Pat. No. 9,866,259 B1 issued Jan. 9, 2018 to Margomenos.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 1 is a table of exemplar specification ranges for electrical, mechanical and environmental features of an antenna system according to the disclosure;

FIGS. 2D-E illustrate an isometric view of alternative configurations of the antenna assembly shown in FIG. 2A;

DETAILED DESCRIPTION

Figure 2A:
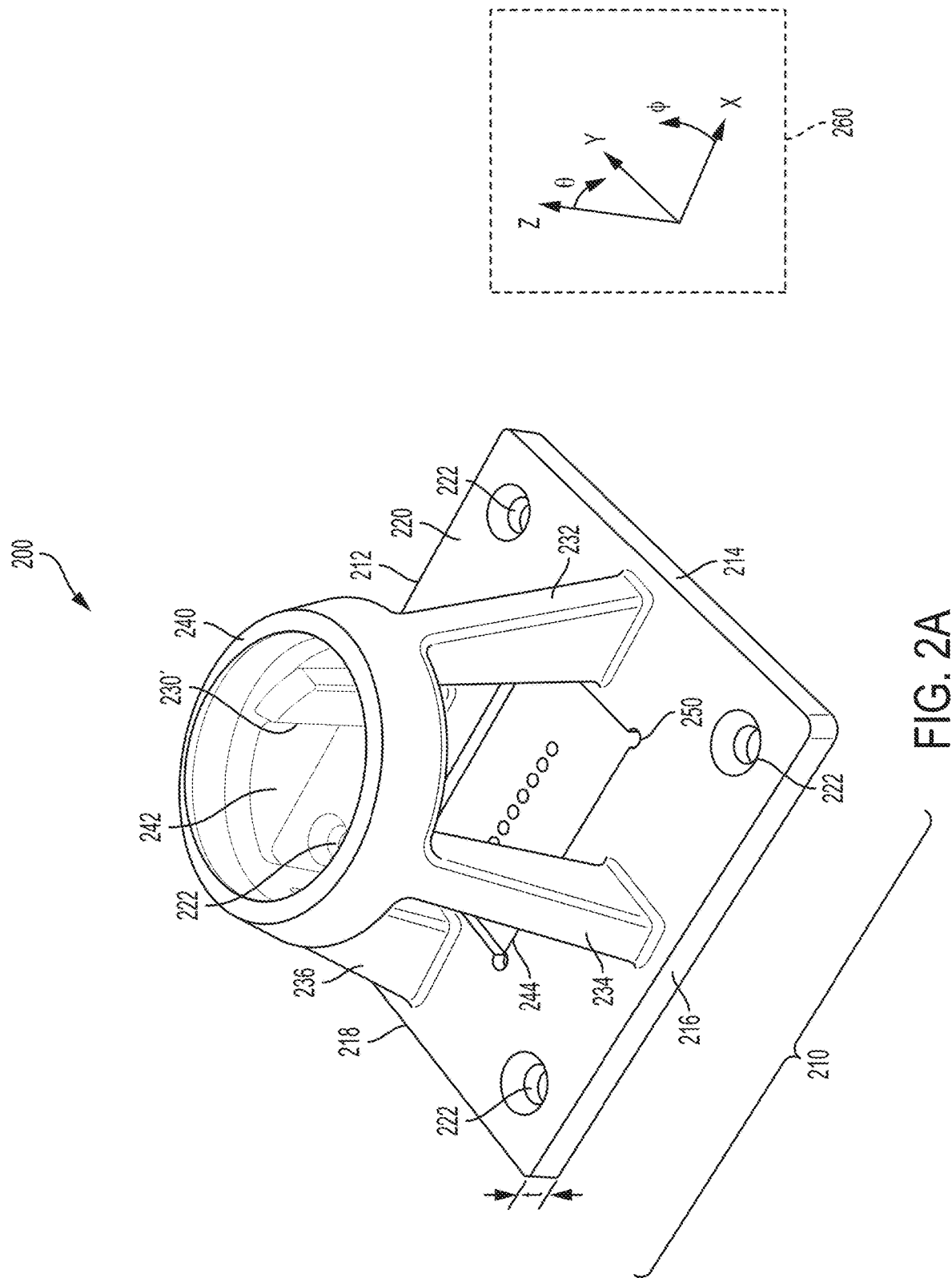
FIGS. 2A-C illustrate an isometric/top view of an antenna assembly, a side view and a bottom view according to the disclosure.

Disclosed is a lens antenna array multiple-input multiple-output (MIMO) communication device. The antenna array utilizes multi-port beam-steering architecture which concentrates radiated energy from an antenna via a dielectric lens to achieve a narrow high-gain beam. The antenna array's compact form factor and low mass make it a suitable structure for integration into, for example, a scanning radar unit.

The lens antenna array is configurable to have 8 antennas/ports which allow simultaneous multiple beams with a field-of-view of +/−15°. The polymer lens enables high side lobe rejection from the radiated energy, which allows scanning radar to operate effectively.

FIG. 1 lists, in tabular format, exemplar specification ranges for radio frequency, mechanical features, and environmental parameters for a device according to the disclosure. Radio frequency specifications listed in the table include frequency band 110, maximum VSWR 112, maximum return loss 114, peak gain 116, efficiency 118, radiation properties 120, polarization 122, and impedance 124. Mechanical features defined in FIG. 1 include dimensions 130, substrate material 132 and connector interface 134. Environmental parameters listed in FIG. 1 include operating temperature range 140, storage temperature range 142, relative humidity range 144, and Restriction of Hazardous Substances compliance 146.

FIG. 2A is an isometric illustration of an exemplar antenna assembly 200 according to the disclosure. FIGS. 2D-E are an isometric view of alternative configurations of the antenna assembly 200 shown in FIG. 2A.

As illustrated, antenna assembly 200 comprises: an antenna base 210, a first support leg 230, a second support leg 232, a third support leg 234, and a fourth support leg 236, a lens holder 240, such as the bezel illustrated, a collimating lens 242, and an antenna array 250. The collimating lens 242 is a curved optical lens that help to make the radiated energy from free space parallel after it passes through the lens before contacting the antenna array. The collimating lens 242 allow the antenna assembly to reject any side lobe from the radiated energy by focusing convergent RF waves from free space to the antenna array.

In the embodiment depicted in FIG. 2A, antenna base 210, first support leg 230, second support leg 232, third support leg 234, and fourth support leg 236, and lens holder 240 are formed as a single, unified structure, typically of ABS polymer. A reference right-hand Cartesian coordinate system 260, in three-dimensions, with x-axis, y-axis and z-axis as well as θ and φ reference angular directions, is provided to assist in description of the disclosure. In other configurations, such as those shown in FIGS. 2D-E, the antenna base 210 could have one, two or three support legs instead of four without departing from the scope of the disclosure. Alternatively, more than four support legs can be provided without departing from the scope of the disclosure. Additionally, mechanisms other than a lens bezel can be provided to secure the lens in position over the base. For example, as shown in FIG. 2D the lens holder 240 is broken into two parts, each part associated with a corresponding leg 232.

Figure 2B:
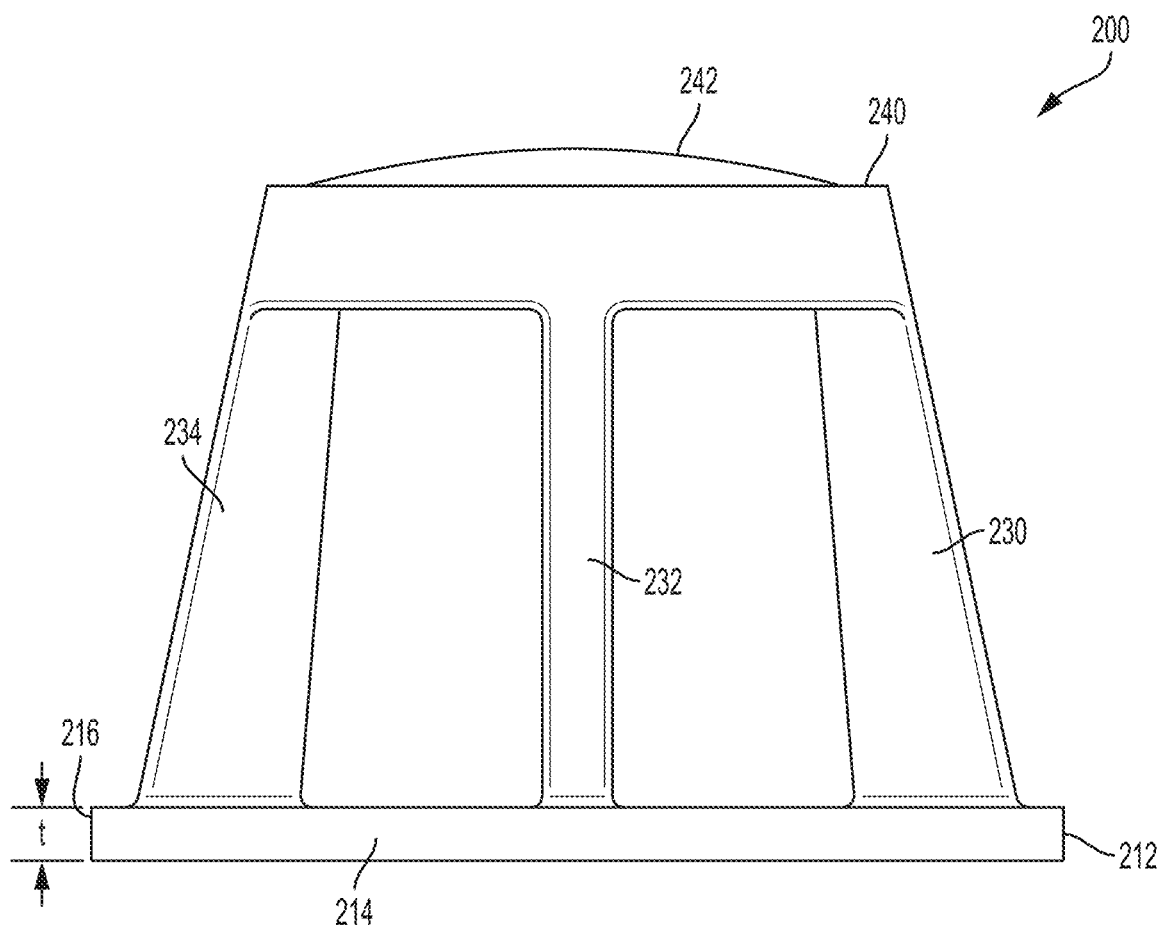

As illustrated, antenna base 210 is rectangular, planar or substantially planar, with a top surface 220, and of uniform thickness t, as depicted in FIGS. 2A-B and D-E, and lies substantially in the x-y plane. The antenna base 210 has a first side 212, a second side 214, a third side 216, and a fourth side 218, numbered clockwise when viewed from a point on the positive z-axis. In other configurations, the antenna base 210 could be rectangular, triangular, round, ovoid, or any other shape without departing from the scope of the disclosure.

Located near each corner of the antenna base 210, are four apertures 222, of circular cross-section, passing through from the top surface 220, through the antenna base 210. Apertures 222 enable a securement device to attach the antenna assembly 200 to an external component or structure. Suitable securement devices include, but are not limited to screw, nut-and-bolt, rivet, etc. As will be appreciated by those skilled in the art, more or fewer apertures 222 can be provided for the securement mechanism. Additionally, other securement techniques can be used in addition or instead of the disclosed securement devices. For example, in some configurations, an adhesive may be provided which engages a target surface and at least a portion of the lower surface of the antenna base 210 to secure the antenna base 210 to the target surface after installation.

Positioned in the antenna base 210 is a cavity 244 or recess, illustrated as having a rectangular shape, with its long sides aligned with the x-axis and its short sides aligned with the y-axis. Antenna array 250 resides in cavity 244. As will be appreciated by those skilled in the art, the antenna array 250 can be positioned within a cavity 244 in the antenna base 210. Where the antenna array 250 is positioned within the cavity 244, the cavity 244 can have the same shape as the antenna array 250. The shapes can include but are not limited to round, square, rectangular (as illustrated), ovoid, and triangular.

Rising in the positive z-direction from top surface 220 of antenna base 210, and terminating at lens holder 240, are the first support leg 230, the second support leg 232, the third support leg 234, and the fourth support leg 236. Each of the first support leg 230, the second support leg 232, the third support leg 234, and the fourth support leg 236 is identical in dimension, is of rectangular cross section, and tapers as it extends in the positive z-direction. The first support leg 230 extends from the top surface 220 of antenna base 210 nearest first side 212, midway between second side 214 and fourth side 218. The second support leg 232 extends from the top surface 220 of antenna base 210 nearest second side 214, midway between first side 212 and third side 216. The third support leg, 234 extends from the top surface 220 of antenna base 210 nearest third side 216, midway between second side 214 and fourth side 218. The fourth support leg 236 extends from the top surface 220 of antenna base 210 nearest fourth side 218, midway between first side 212 and third side 216.

Lens holder 240 is a lens securement device which, as illustrated, is a circular ring that resides atop first support leg 230, the second support leg 232, the third support leg 234, and the fourth support leg 236, parallel to the x-y plane. Housed in lens holder 240 is the collimating lens 242; the collimating lens 242 focuses convergent RF waves from free space to the antenna array 250. Collimating lens 242 is a plano-convex lens that lies in a plane parallel to the x-y plane with its planar surface nearest to and facing toward top surface 220 of antenna base 210 and its convex surface furthest from and facing away from top surface 220 of antenna base 210.

Figure 2C:
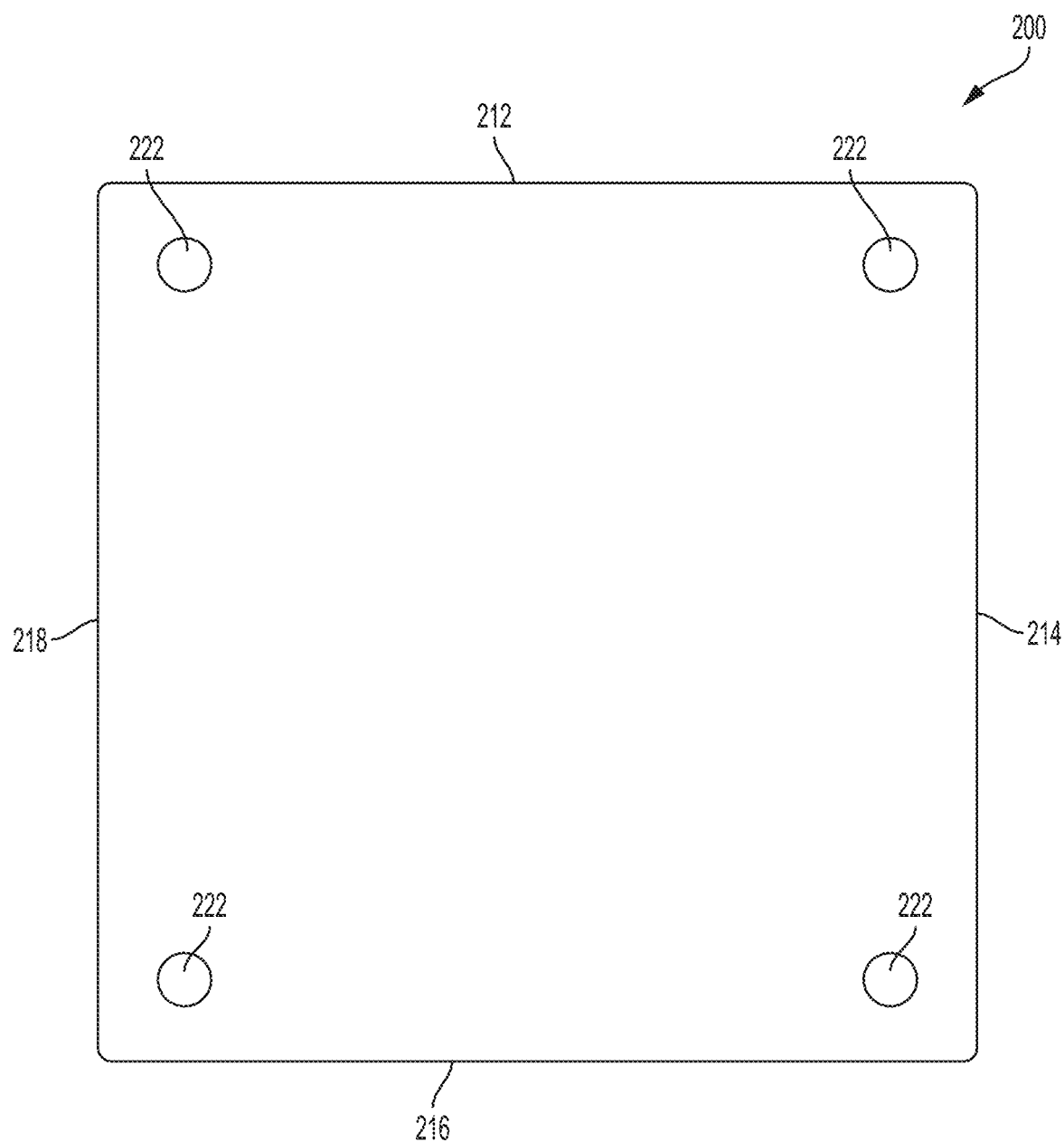
Figure 2D:
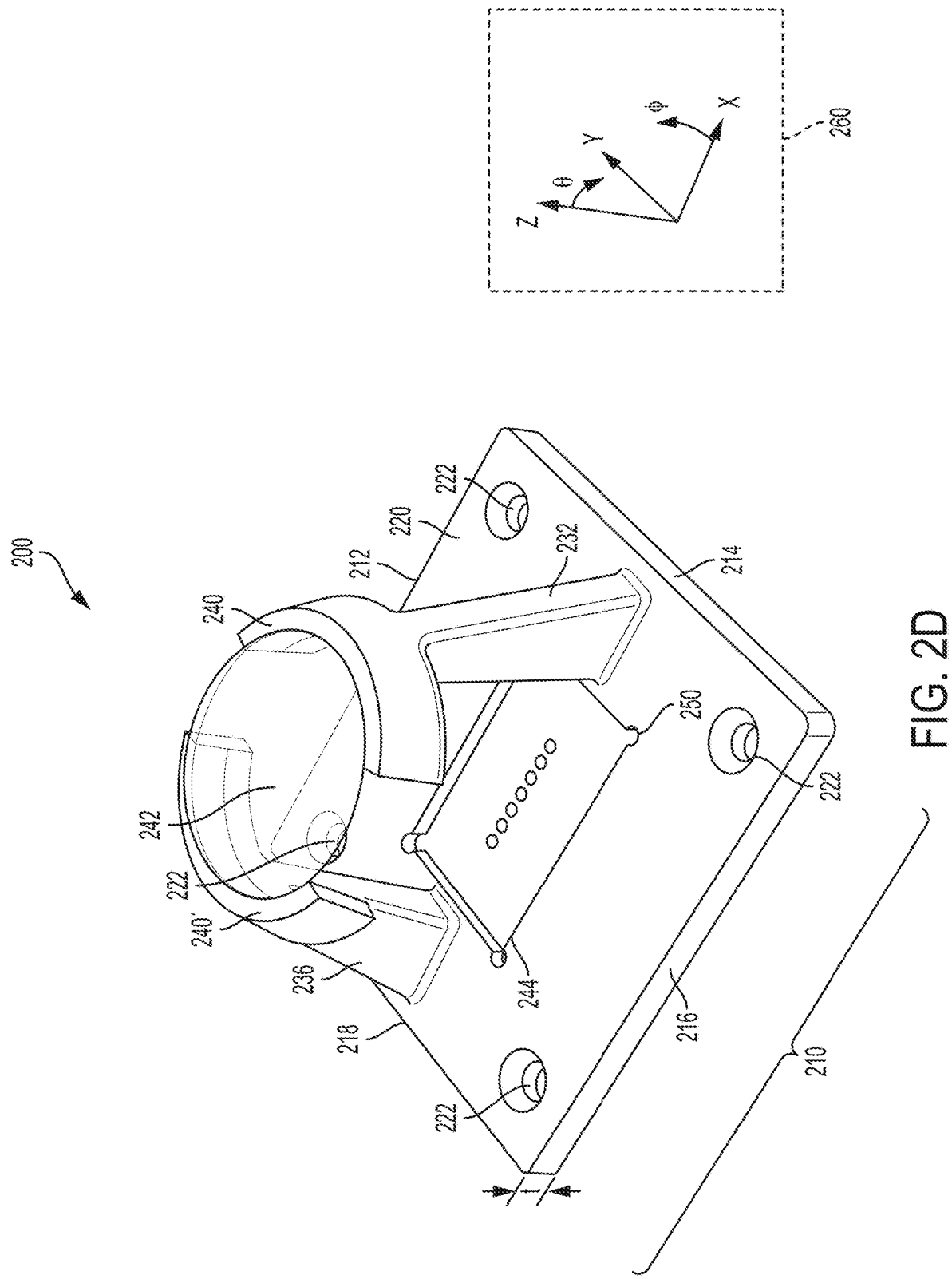

In the embodiment depicted in FIGS. 2A-C, the collimating lens 242 can have a dimension of 25.4 mm in diameter with a focal distance of about 19 mm between the lens and the surface of the antenna. The lens diameter and focal distance can increase or decrease depending on the array and/or antenna size. Additionally, the lens diameter can vary with frequency. Typical materials of construction include N-BK7, N-SF11 polymer, or similar material. Materials are available from, for example, Schott AG (Mainz Germany). As will be appreciated by those skilled in the art, the use of different materials with different dielectric constants can also affect the lens diameter.

Figure 3A:
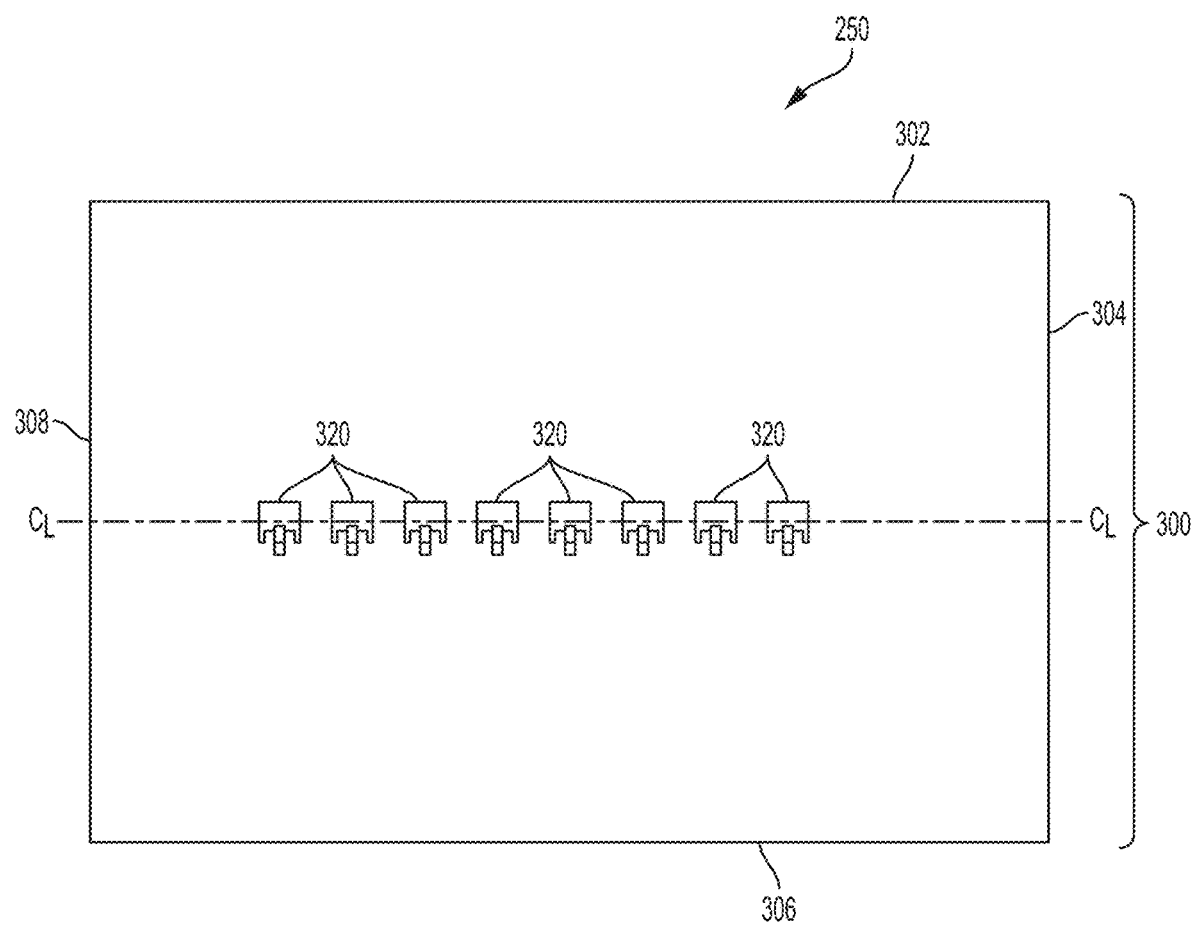
FIG. 3A illustrates a top view of an antenna array according to the disclosure.

FIG. 3A illustrates an exemplar antenna array 250, such as that positioned on the top surface of the antenna base 210 in FIG. 2A. Antenna array 250 comprises: an antenna substrate 300; and eight antenna elements 320, which are depicted as identical antenna elements. As will be appreciated by those skilled in the art, the antenna array size can be increased or decreased for Each antenna element is configurable to be individually fed into a MIMO configuration. However, as will be appreciated by those skilled in the art, each antenna element can be connected via a feed network (corporate, series or other) to reduce the number of feed points and to provide a higher gain array. The antenna substrate 300 is rectangular and substantially planar with a first long side 302, a first short side 304, a second long side 306, and a second short side 308, numbered clockwise as viewed from above. In the embodiment depicted, the dimensions of the antenna substrate 300 are 26 mm×17 mm. Antenna substrate 300 is constructed from a suitable dielectric material such as glass-fiber reinforced PTFE laminate. Lying along the centerline which bisects antenna substrate 300 lengthwise are eight identical antenna elements 320. The antenna elements 320 are evenly spaced along the centerline with the first antenna element 320 spaced approximately 4.6 mm from second short side 308 of the antenna substrate 300; the last antenna element 320 along the centerline is spaced approximately 6.5 mm from first short side 304. As will be appreciated by those skilled in the art, the spacing is subject to frequency, substrate type, and can be varied based on the application of the antenna system. For example, changes can be made for beamforming applications where the radiation pattern side lobes need to be suppressed. Other configurations of an antenna array can be used without departing from the scope of the disclosure.

Figure 3B:
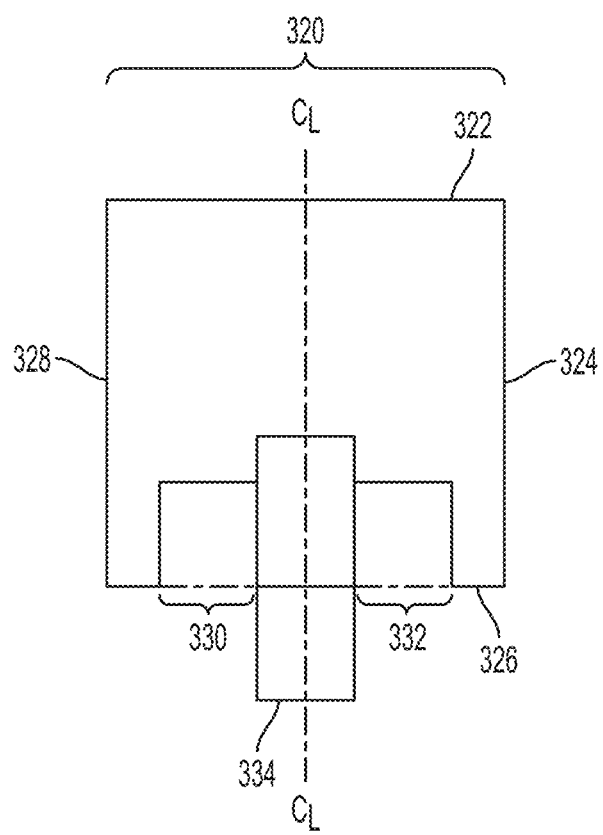
FIG. 3B illustrates a top view of an antenna element according to the disclosure.

FIG. 3B illustrates an individual antenna element 320, as viewed from above. Antenna element 320 is illustrated as rectangular in overall shape with two identical notches cut in one side. As will be appreciated by those skilled in the art, the antenna element 320 need not be rectangular and other shapes can be used without departing from the scope of the disclosure. The perimeter of antenna element 320 is defined by first element long side 322, first element short side 324, second element long side 326 and second element short side 328, numbered clockwise when viewed from above. In the embodiment depicted, first element long side 322 and second element long side 326 are 1.09 mm in length; first element short side 324 and second element short side 328 are 1.07 mm in length. First notch 330 and second notch 332 are identically dimensioned and are cut from second element long side 326. First notch 330 and second notch 332 are positioned on either side of the centerline which bisect antenna element 320 widthwise such that the resulting shape is symmetric about the element centerline. First notch 330 and second notch 332 are approximately square measuring approximately 0.27 mm×0.27 mm each. First notch 330 is positioned along second element long side 326 such that there is approximately 0.14 mm from second element short side 328 to the nearest side of first notch 330. Similarly, second notch 332 is positioned along second element long side 326 such that there is approximately 0.14 mm from first element short side 324 to the nearest side of second notch 332. Connector tab 334, which provides a mechanism for connection to external electronics, is rectangular, measuring approximately 0.26 mm by 0.73 mm. Connector tab 334 lies along the element centerline such that the element centerline bisects the connector tab 334 lengthwise and protrudes beyond second element long side by approximately 0.31 mm. Connection to external electronics/systems may be achieved either directly, via a microstrip-to-waveguide transition, aperture coupled, or proximity coupled.

To characterize performance of the disclosed device, a number of simulations were performed for an 8×1 antenna array with identical characteristics and specifications to the disclosure. In the simulations, elements were numbered antenna 1 through antenna 8, corresponding to individual antenna element 320, from left to right (FIG. 3A). Because each antenna element is identical in the disclosed 8×1 array, it was expected that many data curves would differ from one another only minimally. This expectation is borne out in results of the simulation.

Figure 4:
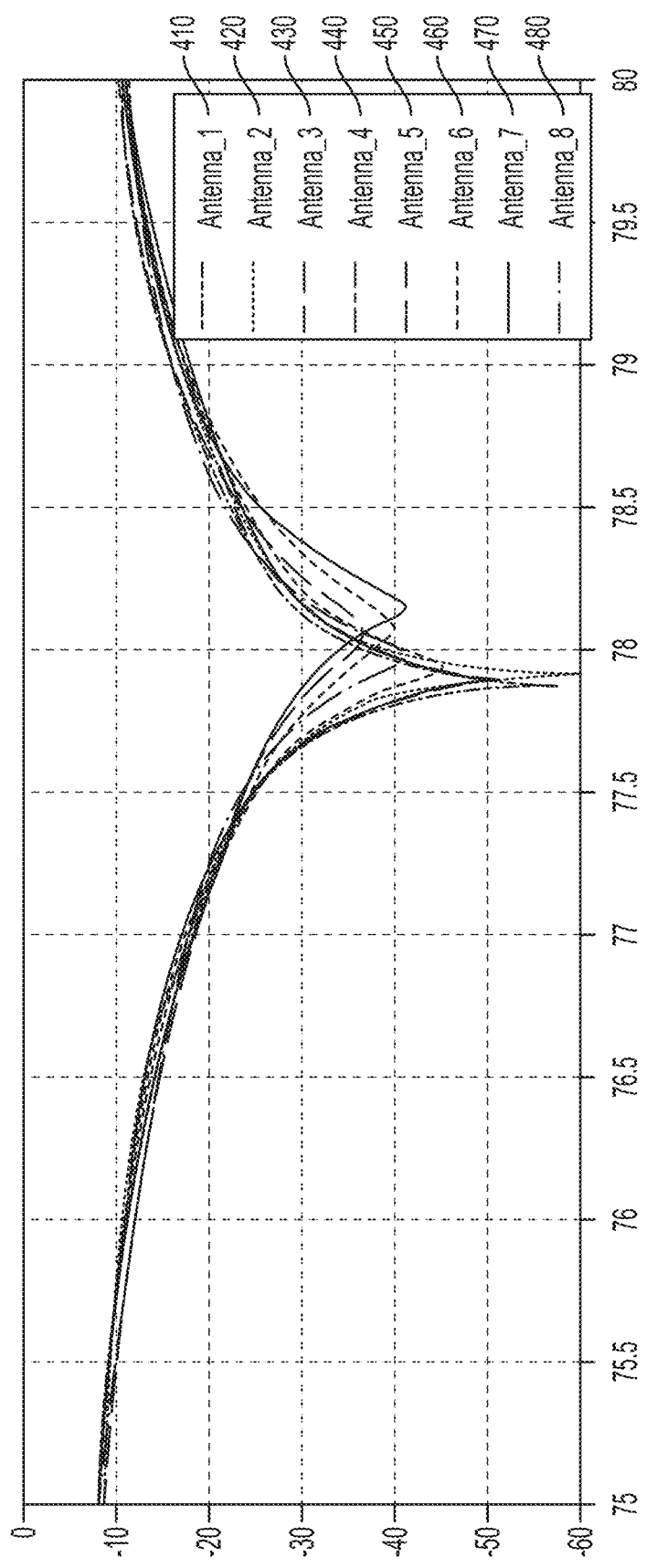
FIG. 4 is a plot of simulated S-parameters of an antenna system according to the disclosure.

FIG. 4 is a plot of simulated S-parameters from 75 GHz to 80 GHz of an 8×1 antenna array that models S-parameters of the disclosed system. As will be appreciated by those skilled in the art, the antenna arrays and systems can be scaled up or down to operate at any desired frequency. Traces on the plot represent results for antenna 1 S-parameter 410, antenna 2 S-parameter 420, antenna 3 S-parameter 430, antenna 4 S-parameter 440, antenna 5 S-parameter 450, antenna 6 S-parameter 460, antenna 7 S-parameter 470, and antenna 8 S-parameter 480. Note that in the region from 76 GHz to 77 GHz, the traces are almost identical deviating from on another only slightly. In the region from 76 GHz to 77 GHz, the S-parameter values range from approximately −11 dB at 76 GHz to approximately −19 dB at 77 GHz.

Figure 5:
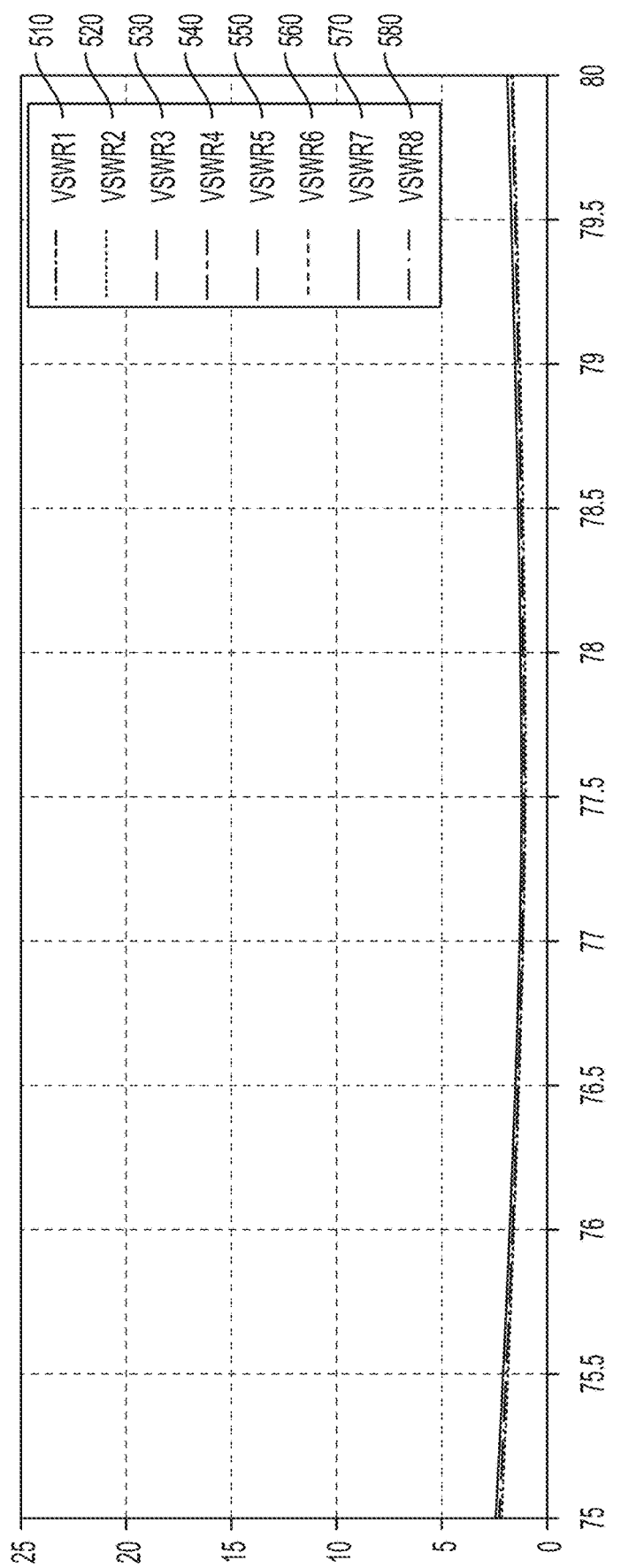
FIG. 5 is a plot of the simulated voltage standing wave ratio (VSWR) of an antenna system according to the disclosure.

FIG. 5 is a plot of simulated VSWR from 75 GHz to 80 GHz of an 8×1 antenna array that models VSWR of the disclosed system. Traces on the plot represent results for antenna 1 VSWR 510, antenna 2 VSWR 520, antenna 3 VSWR 530, antenna 4 VSWR 540, antenna 5 VSWR 550, antenna 6 VSWR 560, antenna 7 VSWR 570, and antenna 8 VSWR 580. Note that the individual traces are so uniform as to be virtually indistinguishable. In the region from 76 GHz to 77 GHz, the VSWR values range from approximately 2.3 at 76 GHz to approximately 1.8 at 77 GHz.

Figure 6:
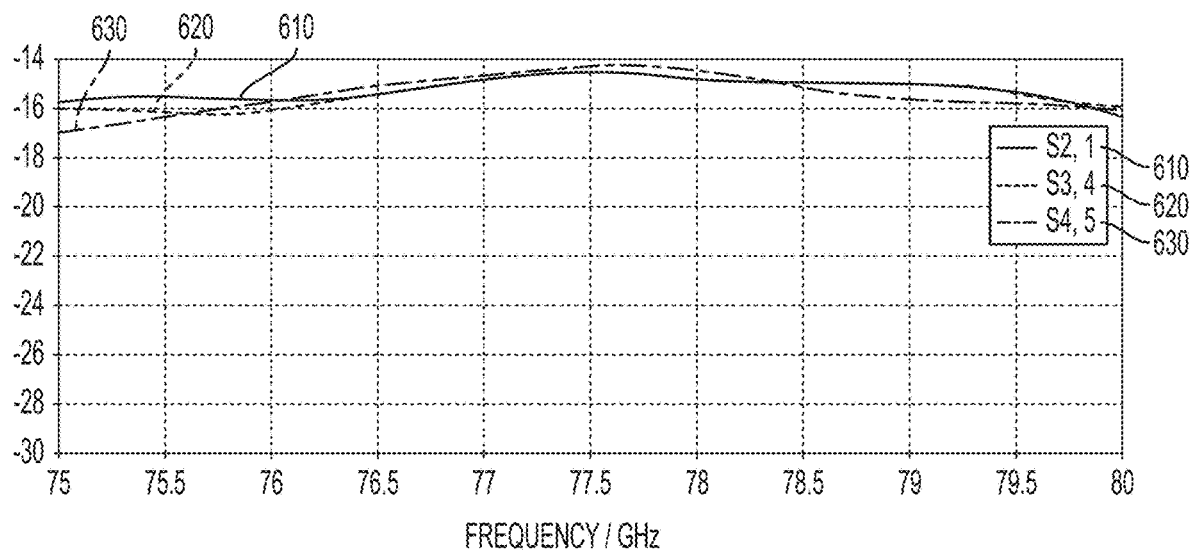
FIG. 6 is a plot of the simulated isolation of adjacent antenna elements of an antenna system according to the disclosure.

FIG. 6 is a plot of simulated isolation of selected adjacent antenna elements from 75 GHz to 80 GHz of an 8×1 antenna array that models adjacent element isolation of the disclosed system. Traces on the plot represent results for isolation between antenna 1 and antenna 2 610, isolation between antenna 3 and antenna 4 620, and isolation between antenna 4 and antenna 5 630. Note that in the region from 76 GHz to 77 GHz, the traces are almost identical deviating from on another only slightly. In the region from 76 GHz to 77 GHz, adjacent antenna element isolation ranges from approximately −16 dB at 76 GHz to approximately −15 dB at 77 GHz. It is expected that isolation between other adjacent antenna elements would yield similar results.

Figure 7:
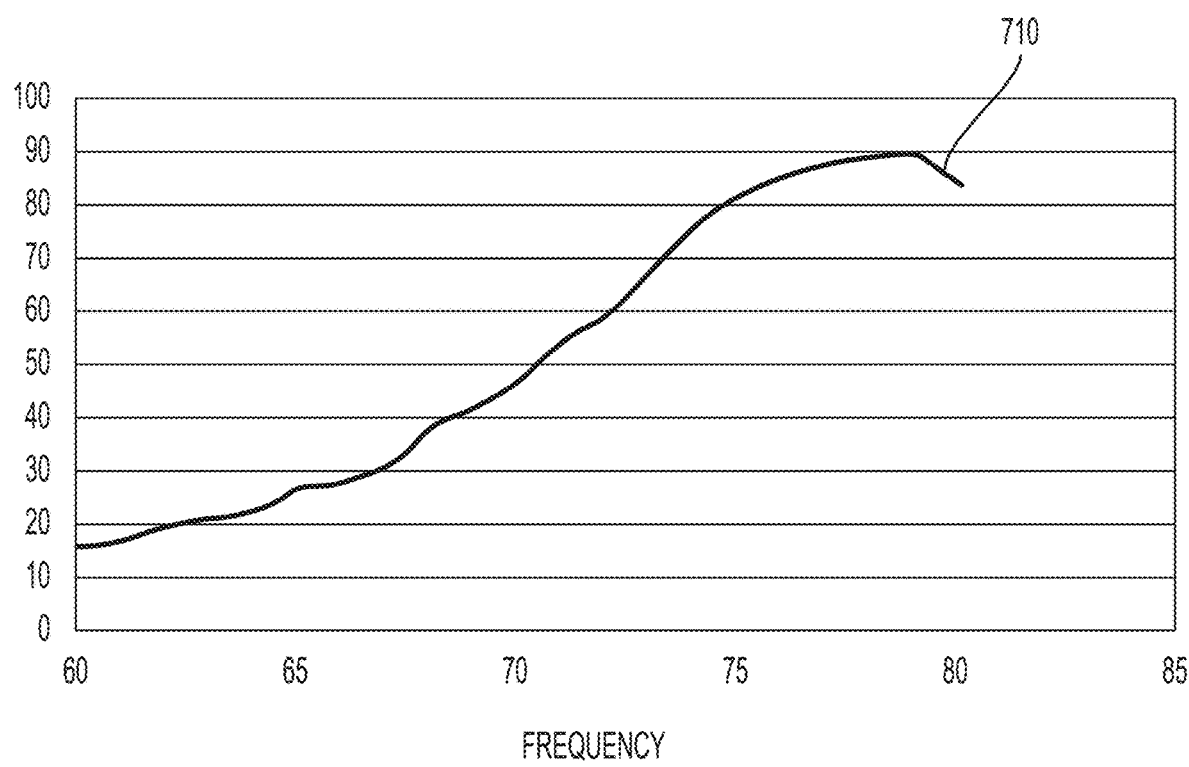
FIG. 7 is a plot of the simulated total efficiency of an antenna system according to the disclosure.

FIG. 7 is a plot of simulated total efficiency from 75 GHz to 80 GHz of an 8×1 antenna array that models total efficiency of the disclosed device. The trace on the plot represents results for total efficiency 710. In the frequency range from 76 GHz to 77 GHz, total efficiency 710 is monotonically increasing, from a value of approximately 86% at 76 GHz to a value of approximately 89% at 77 GHz.

Figure 8:
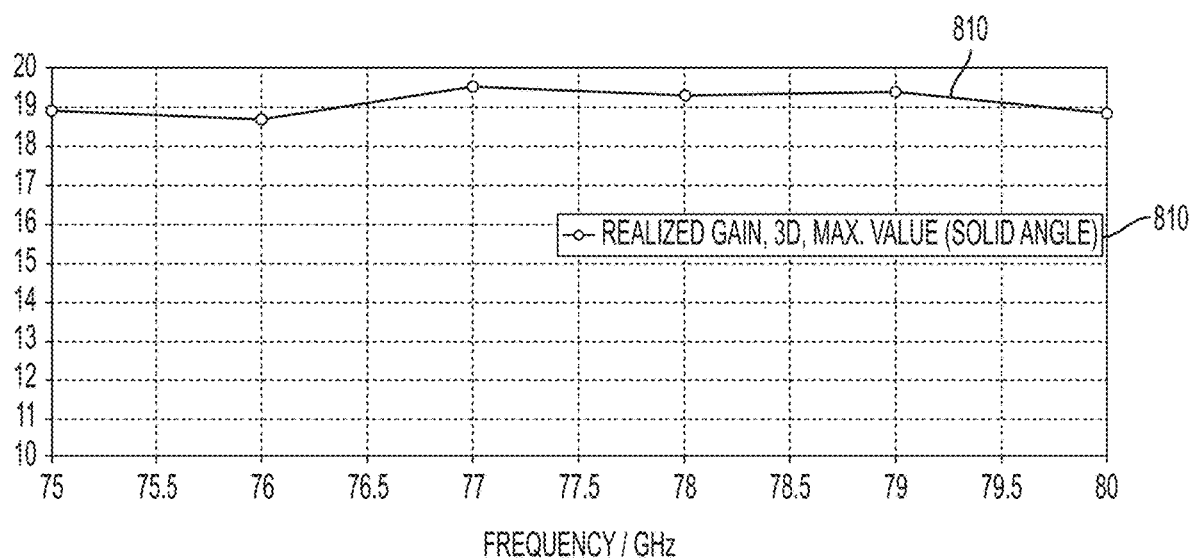
FIG. 8 is a plot of the simulated maximum three-dimensional gain of an antenna system according to the disclosure.

FIG. 8 is a plot of simulated realized maximum three-dimensional, solid-angle gain from 75 GHz to 80 GHz of an 8×1 antenna array that models total efficiency of the disclosed device. The trace on the plot represents results for realized maximum gain 810. In the frequency range from 76 GHz to 77 GHz, realized maximum gain 810 exhibits straight-line increase—moving from a value of approximately 18.7 dB at 76 GHz to a value of approximately 19.5 dB at 77 GHz.

Figure 9:
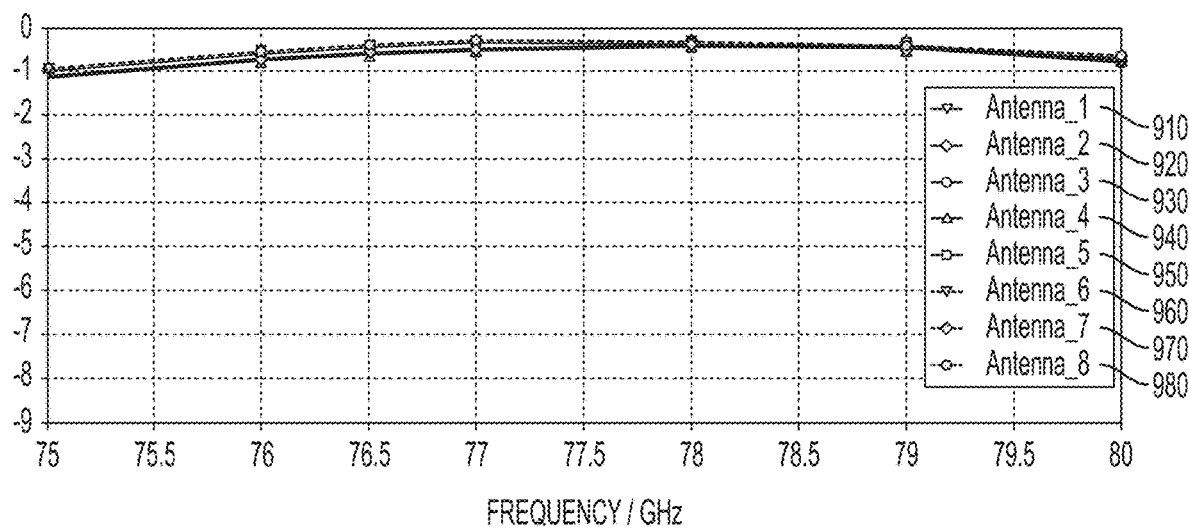
FIG. 9 is a plot of the simulated one-dimensional efficiencies of individual antenna elements of an antenna system according to the disclosure.

FIG. 9 is a plot of simulated one-dimensional efficiencies from 75 GHz to 80 GHz of an 8×1 antenna array that models one-dimensional efficiencies of antenna elements of the disclosed device. Traces on the plot represent results for antenna 1 one-dimensional efficiency 910, antenna 2 one-dimensional efficiency 920, antenna 3 one-dimensional efficiency 930, antenna 4 one-dimensional efficiency 940, antenna 5 one-dimensional efficiency 950, antenna 6 one-dimensional efficiency 960, antenna 7 one-dimensional efficiency 970, and antenna 8 one-dimensional efficiency 980. In the frequency range from 76 GHz to 77 GHz, the one-dimensional efficiency values are monotonically increasing, ranging between approximately −0.9 dB to −0.5 dB at 76 GHz to a values ranging between −0.6 dB and −0.4 dB at 77 GHz.

To characterize cross-polarization of the disclosed system, far field realized gain was simulated in the x-z plane for each antenna element 320 of the disclosure. In the simulations, elements were numbered antenna 1 through antenna 8, each corresponding to an individual antenna element 320, from left to right in FIG. 3A. In each simulation, θ=0° corresponds to the positive z-axis of reference coordinate system 260 (FIG. 2), and θ=90° corresponds to the positive x-axis of reference coordinate system 260 (FIG. 2).

Figure 10:
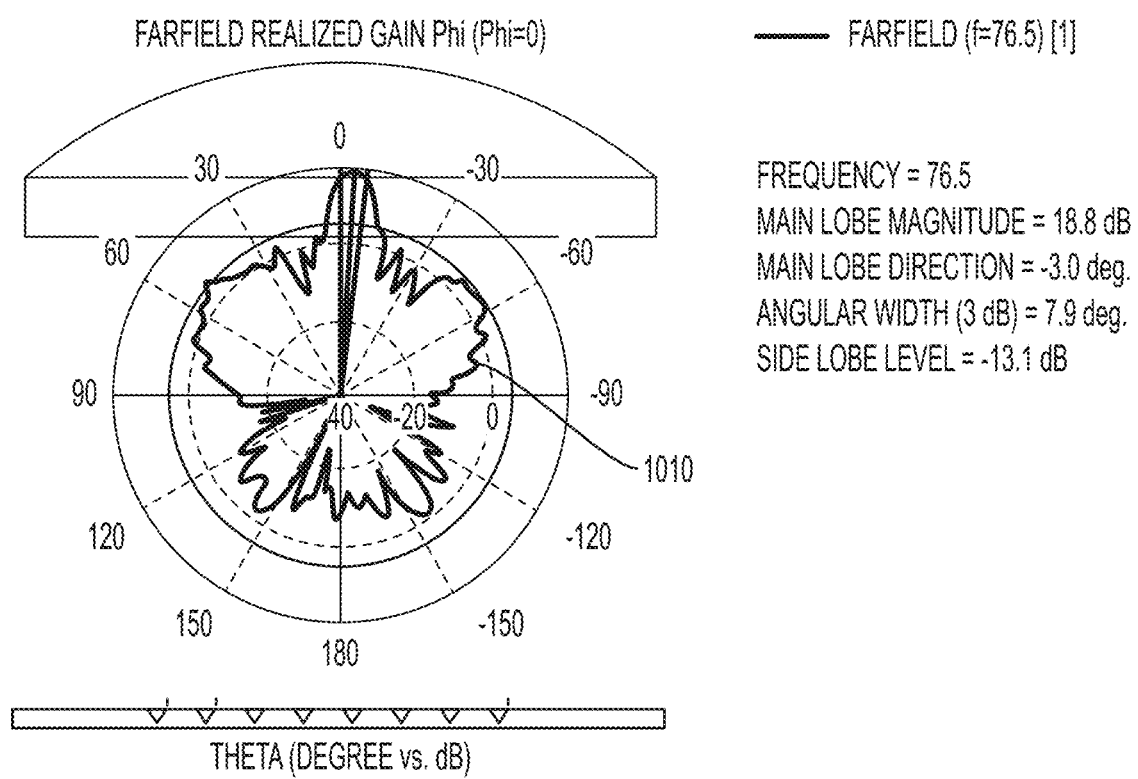
FIG. 10 is a plot of simulated x-y plane co-polarization of an antenna element of an antenna system according to the disclosure.

FIG. 10 is a plot of simulated far field realized gain in the x-z plane at a frequency of 76.5 GHz for antenna 1. The simulation models the gain of the leftmost antenna element 320 (FIG. 3A) of the disclosed system. The trace on the plot represents results for far field realized gain 1010 measured in dB. For antenna 1, main lobe magnitude is 18.8 dB, occurring at θ=−3°, and 3 dB angular width is 7.9°. Side lobe level for antenna 1 is −13.1 dB.

Figure 11:
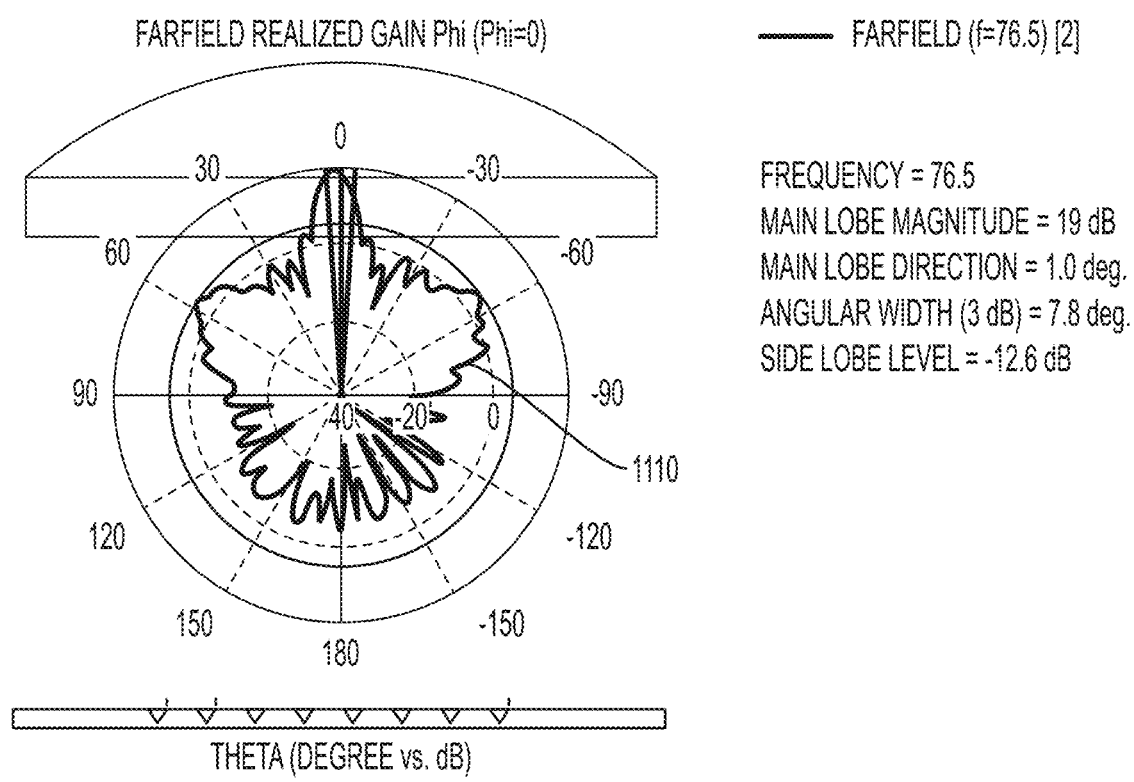
FIG. 11 is a plot of simulated x-y plane co-polarization of an antenna element of an antenna system according to the disclosure.

FIG. 11 is a plot of simulated far field realized gain in the x-z plane at a frequency of 76.5 GHz for antenna 2. The simulation models the gain of the second-from-left antenna element 320 (FIG. 3A) of the disclosed system. The trace on the plot represents results for far field realized gain 1110 measured in dB. For antenna 2, main lobe magnitude is 19.0 dB, occurring at θ=1.0°, and 3 dB angular width is 7.8°. Side lobe level for antenna 2 is −12.6 dB.

Figure 12:
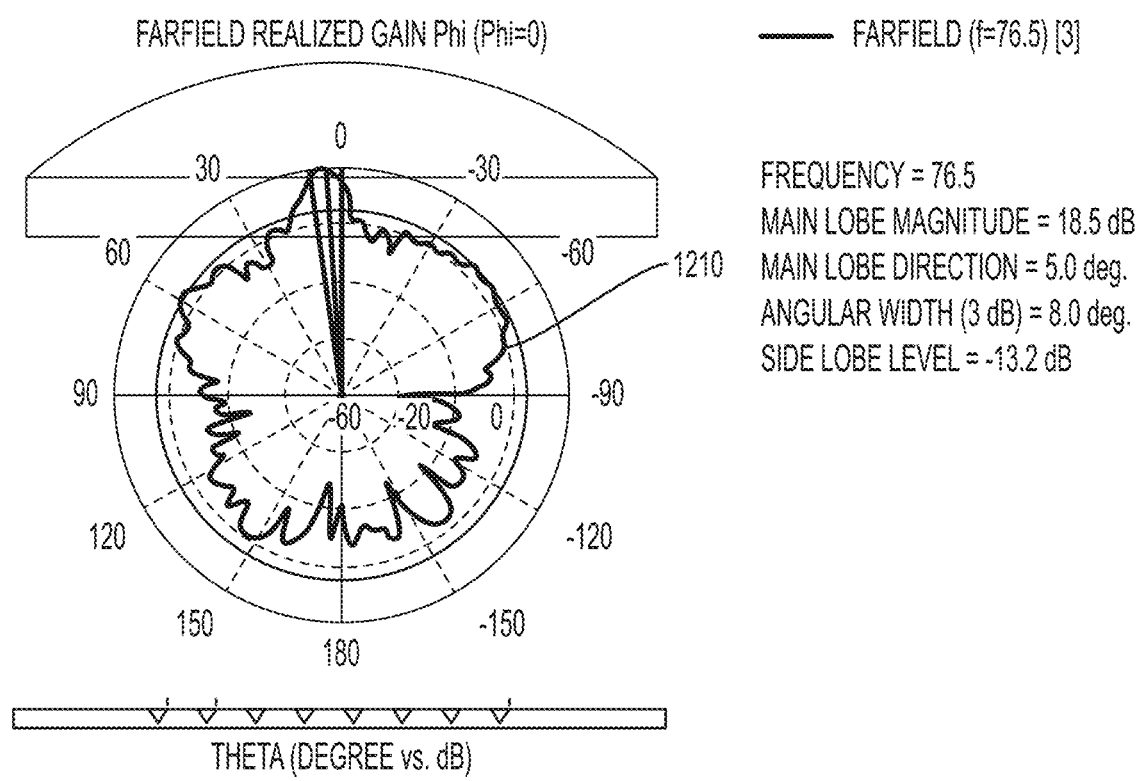
FIG. 12 is a plot of simulated x-y plane co-polarization of an antenna element of an antenna system according to the disclosure.

FIG. 12 is a plot of simulated far field realized gain in the x-z plane at a frequency of 76.5 GHz for antenna 3. The simulation models the gain of the third-from-left antenna element 320 (FIG. 3A) of the disclosed system. The trace on the plot represents results for far field realized gain 1210 measured in dB. For antenna 3, main lobe magnitude is 18.5 dB, occurring at θ=5.0°, and 3 dB angular width is 8.0°. Side lobe level for antenna 3 is −13.2 dB.

Figure 13:
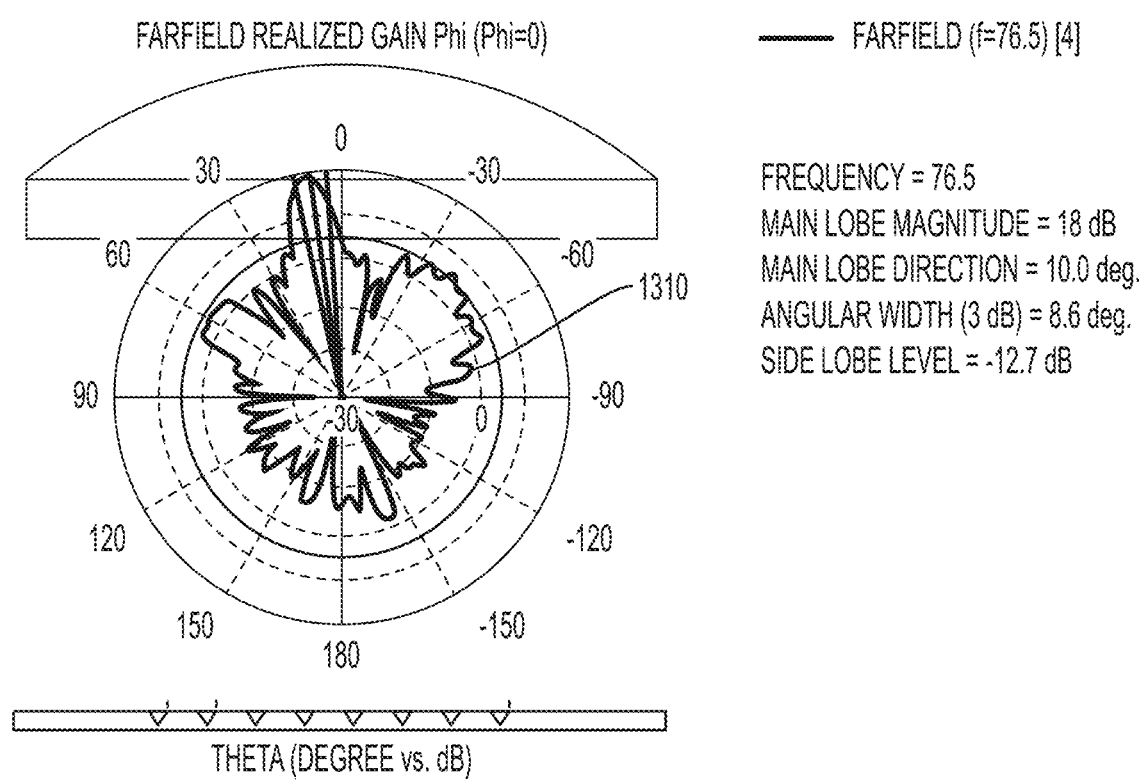
FIG. 13 is a plot of simulated x-y plane co-polarization of an antenna element of an antenna system according to the disclosure.

FIG. 13 is a plot of simulated far field realized gain in the x-z plane at a frequency of 76.5 GHz for antenna 4. The simulation models the gain of the fourth-from-left antenna element 320 (FIG. 3A) of the disclosed system. The trace on the plot represents results for far field realized gain 1320 measured in dB. For antenna 4, main lobe magnitude is 18.0 dB, occurring at θ=10.0°, and 3 dB angular width is 8.6°. Side lobe level for antenna 4 is −12.7 dB.

Figure 14:
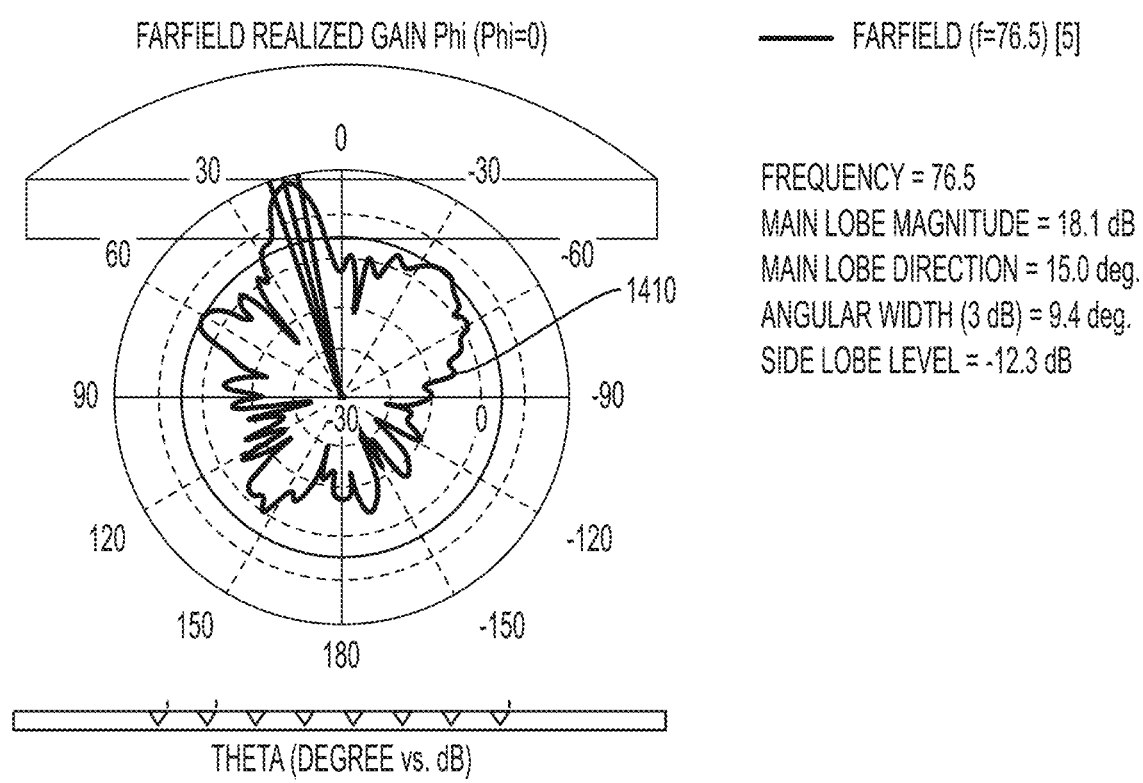
FIG. 14 is a plot of simulated x-y plane co-polarization of an antenna element of an antenna system according to the disclosure.

FIG. 14 is a plot of simulated far field realized gain in the x-z plane at a frequency of 76.5 GHz for antenna 5. The simulation models the gain of the fifth-from-left antenna element 320 (FIG. 3A) of the disclosed system. The trace on the plot represents results for far field realized gain 1410 measured in dB. For antenna 5, main lobe magnitude is 18.1 dB, occurring at θ=15.0°, and 3 dB angular width is 9.4°. Side lobe level for antenna 5 is −12.3 dB.

Figure 15:
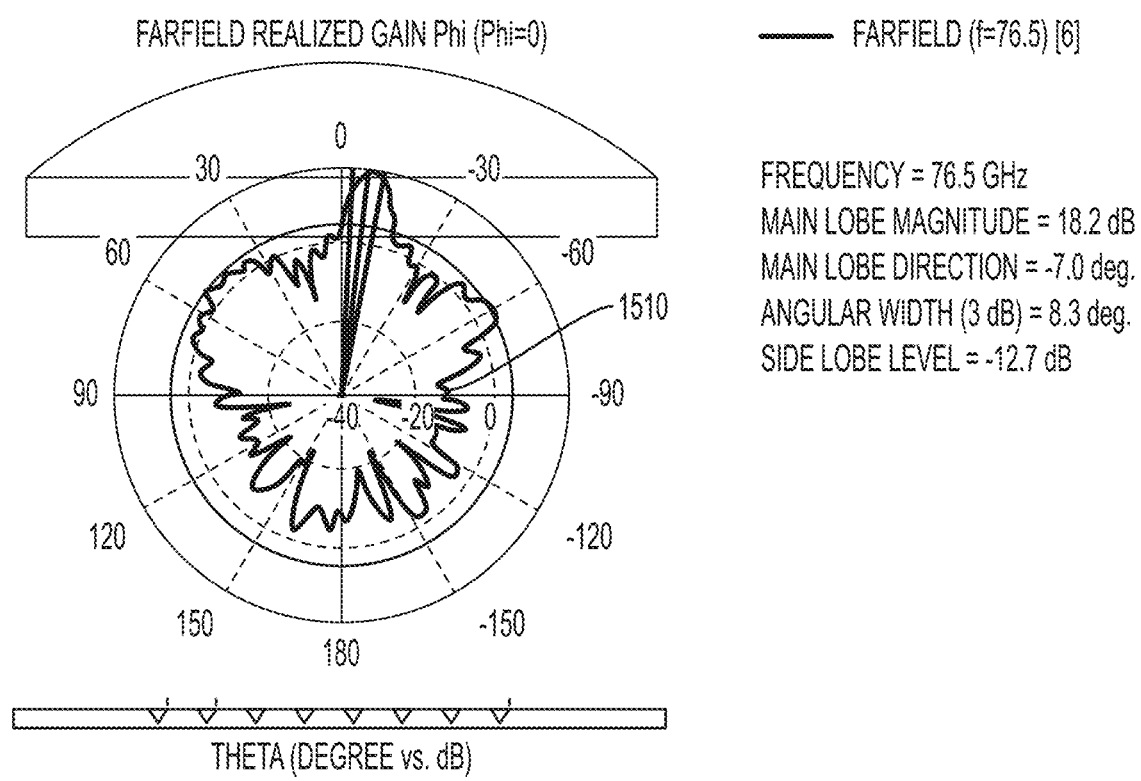
FIG. 15 is a plot of simulated x-y plane co-polarization of an antenna element of an antenna system according to the disclosure.

FIG. 15 is a plot of simulated far field realized gain in the x-z plane at a frequency of 76.5 GHz for antenna 6. The simulation models the gain of the sixth-from-left antenna element 320 (FIG. 3A) of the disclosed system. The trace on the plot represents results for far field realized gain 1510 measured in dB. For antenna 6, main lobe magnitude is 18.2 dB, occurring at θ=−7.0°, and 3 dB angular width is 8.3°. Side lobe level for antenna 6 is −12.7 dB.

Figure 16:
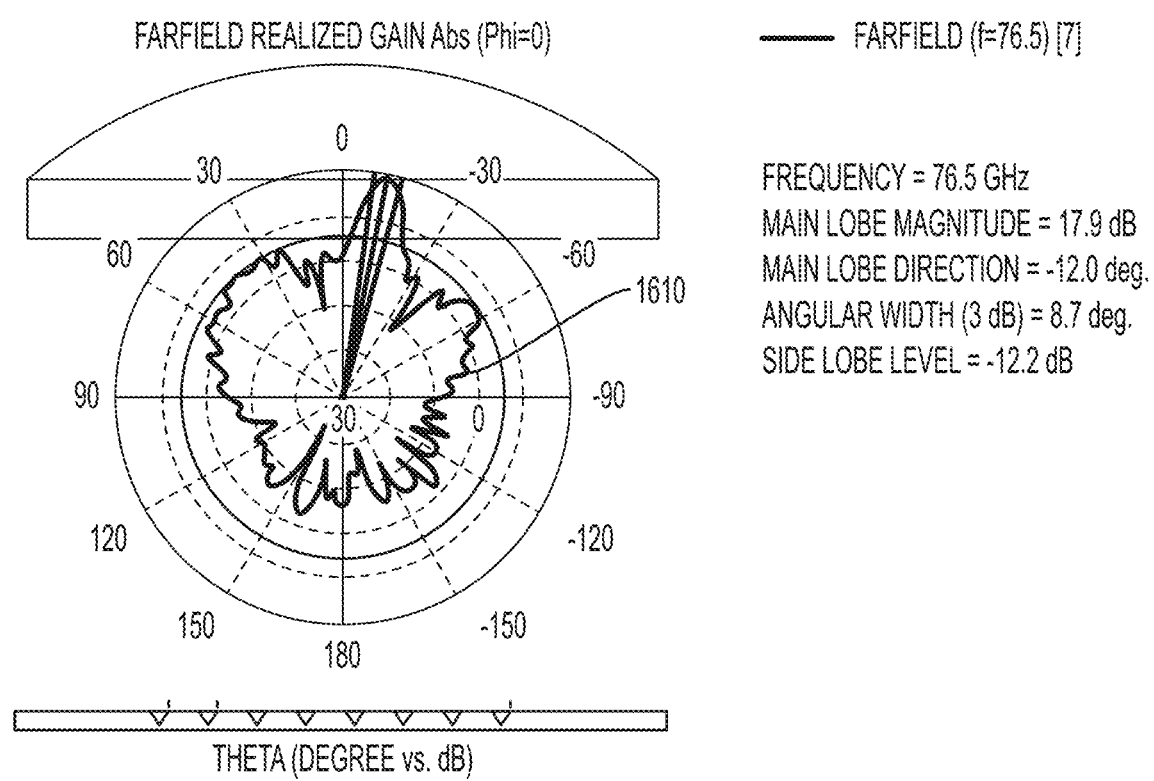
FIG. 16 is a plot of simulated x-y plane co-polarization of an antenna element of an antenna system according to the disclosure.

FIG. 16 is a plot of simulated far field realized gain in the x-z plane at a frequency of 76.5 GHz for antenna 7. The simulation models the gain of the seventh-from-left antenna element 320 (FIG. 3A) of the disclosed system. The trace on the plot represents results for far field realized gain 1610 measured in dB. For antenna 7, main lobe magnitude is 17.9 dB, occurring at θ=−12.0°, and 3 dB angular width is 8.7°. Side lobe level for antenna 7 is −12.2 dB.

Figure 17:
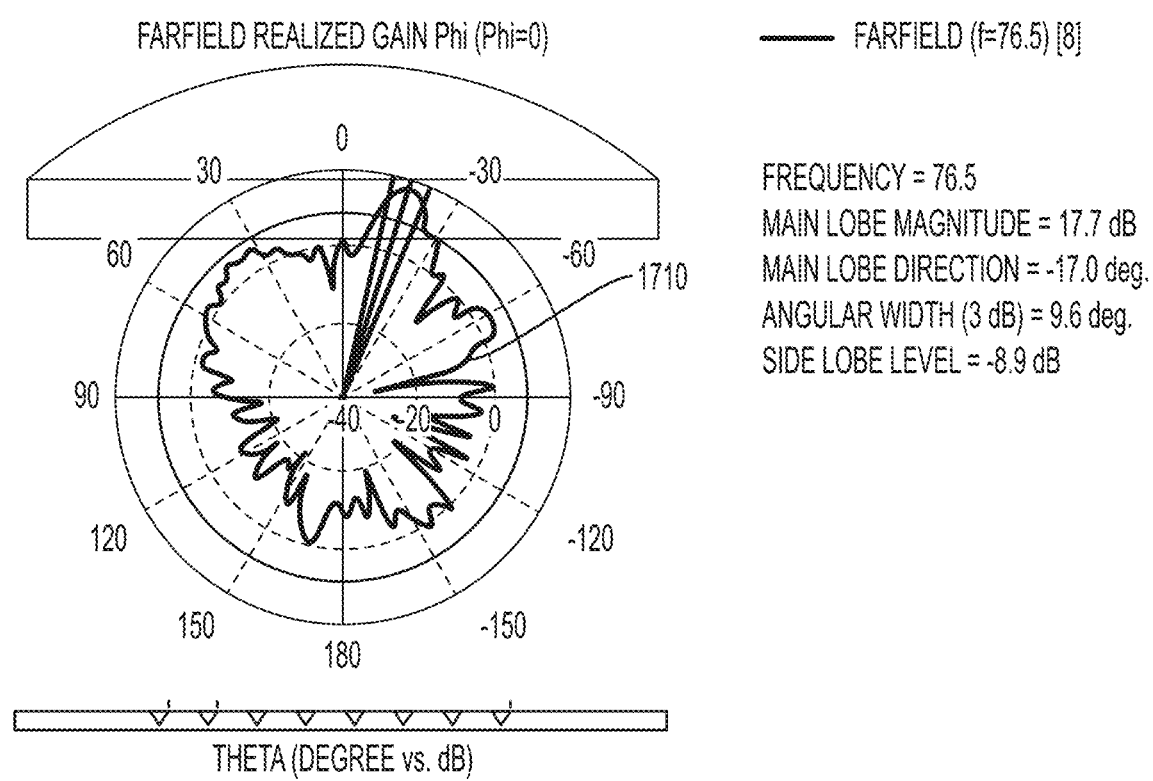
FIG. 17 is a plot of simulated x-y plane co-polarization of an antenna element of an antenna system according to the disclosure.

FIG. 17 is a plot of simulated far field realized gain in the x-z plane at a frequency of 76.5 GHz for antenna 8. The simulation models the gain of the rightmost antenna element 320 (FIG. 3A) of the disclosed system. The trace on the plot represents results for far field realized gain 1710 measured in dB. For antenna 8, main lobe magnitude is 17.7 dB, occurring at θ=−17.0°, and 3 dB angular width is 9.6°. Side lobe level for antenna 8 is −8.9 dB.

Figure 18:
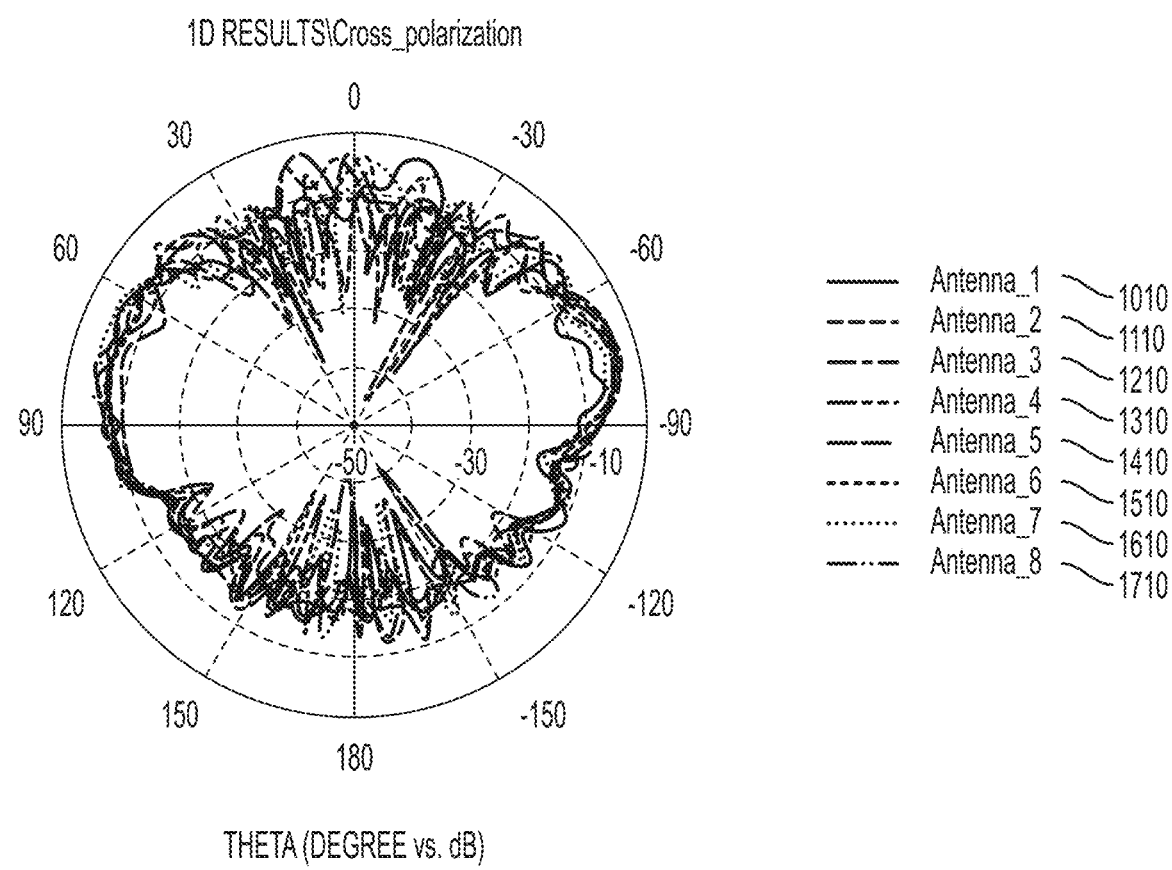
FIG. 18 is a plot of simulated x-y plane co-polarization of several antenna elements of an antenna system according to the disclosure.

FIG. 18 is a composite plot of simulated far field realized gain in the x-z plane at a frequency of 76.5 GHz for antennas 1-8, derived from the individual plots in FIGS. 10-17. Traces on the plot represent results for far field realized gain 1010 of antenna 1 (FIG. 10), 1110 of antenna 2 (FIG. 11), 1210 of antenna 3 (FIG. 12), 1320 of antenna 4 (FIG. 13), 1410 of antenna 5 (FIG. 14), 1510 of antenna 6 (FIG. 15), 1610 of antenna 7 (FIG. 16), and 1710 of antenna 8 (FIG. 17), superposed onto a single plot. For antennas 1-8, main lobe magnitude ranges from 17.9 dB to 19.0 dB; main lobe direction ranges from −17.0° to 15.0°; side lobe level ranges from −13.2 dB to −8.9 dB; and 3 dB angular width ranges from 7.8° to 9.6°.

Figure 19:
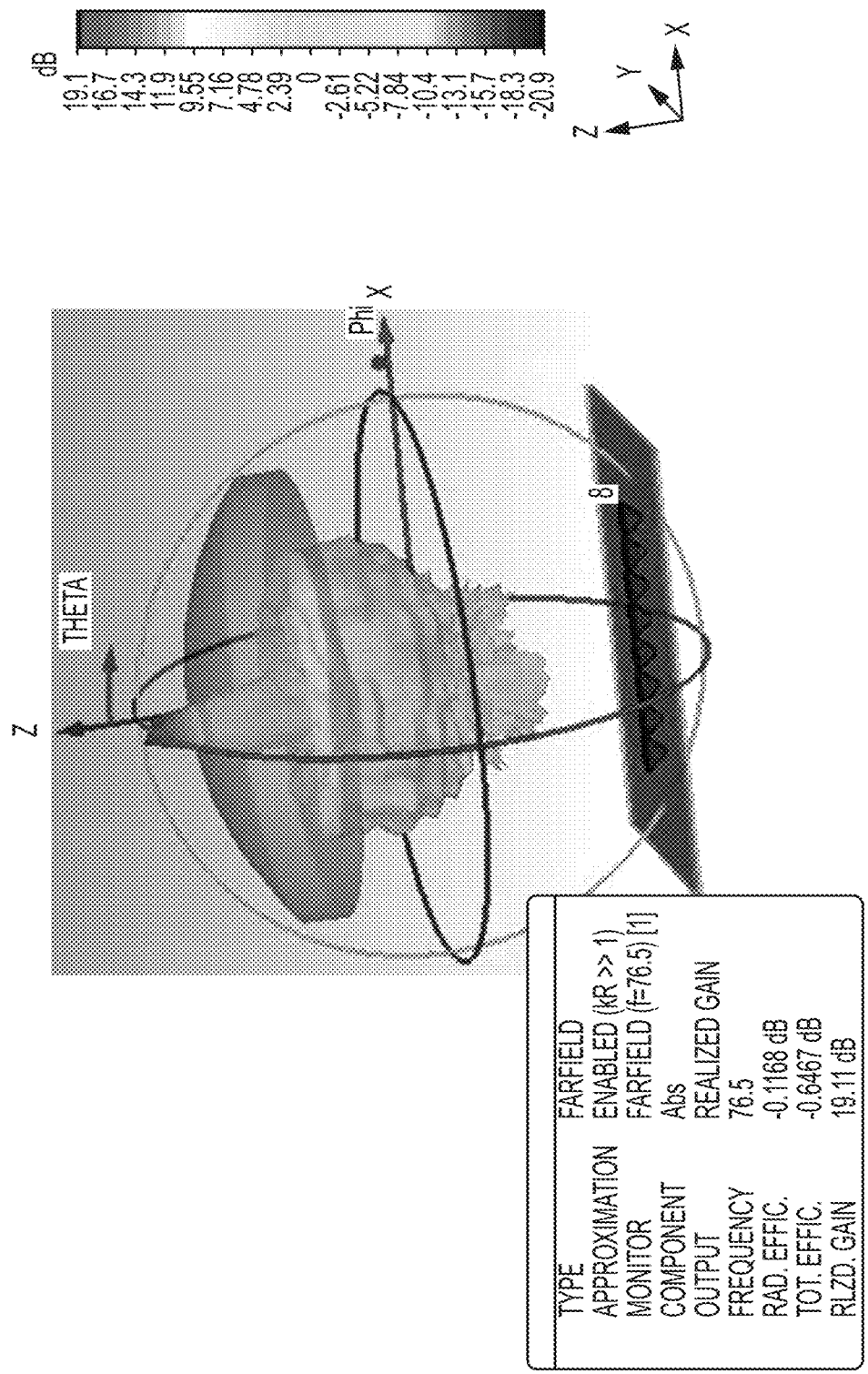
FIG. 19 is a three-dimensional plot of simulated radiation pattern of an antenna element of an antenna system according to the disclosure.

Three-dimensional far field radiation patterns were simulated for each antenna element 320 (FIG. 3A) of the disclosure. FIG. 19 is a three-dimensional plot of the simulated radiation pattern of leftmost antenna element 320 (FIG. 3A) of the disclosed device at a frequency of 76.5 GHz. The plot illustrates the magnitude and orientation of the radiation pattern with respect to reference coordinate system 260 (FIG. 2A). Maximum realized gain is 19.11 dB; radiation efficiency is −0.1168 dB; and total efficiency is −0.6467 dB.

Figure 20:
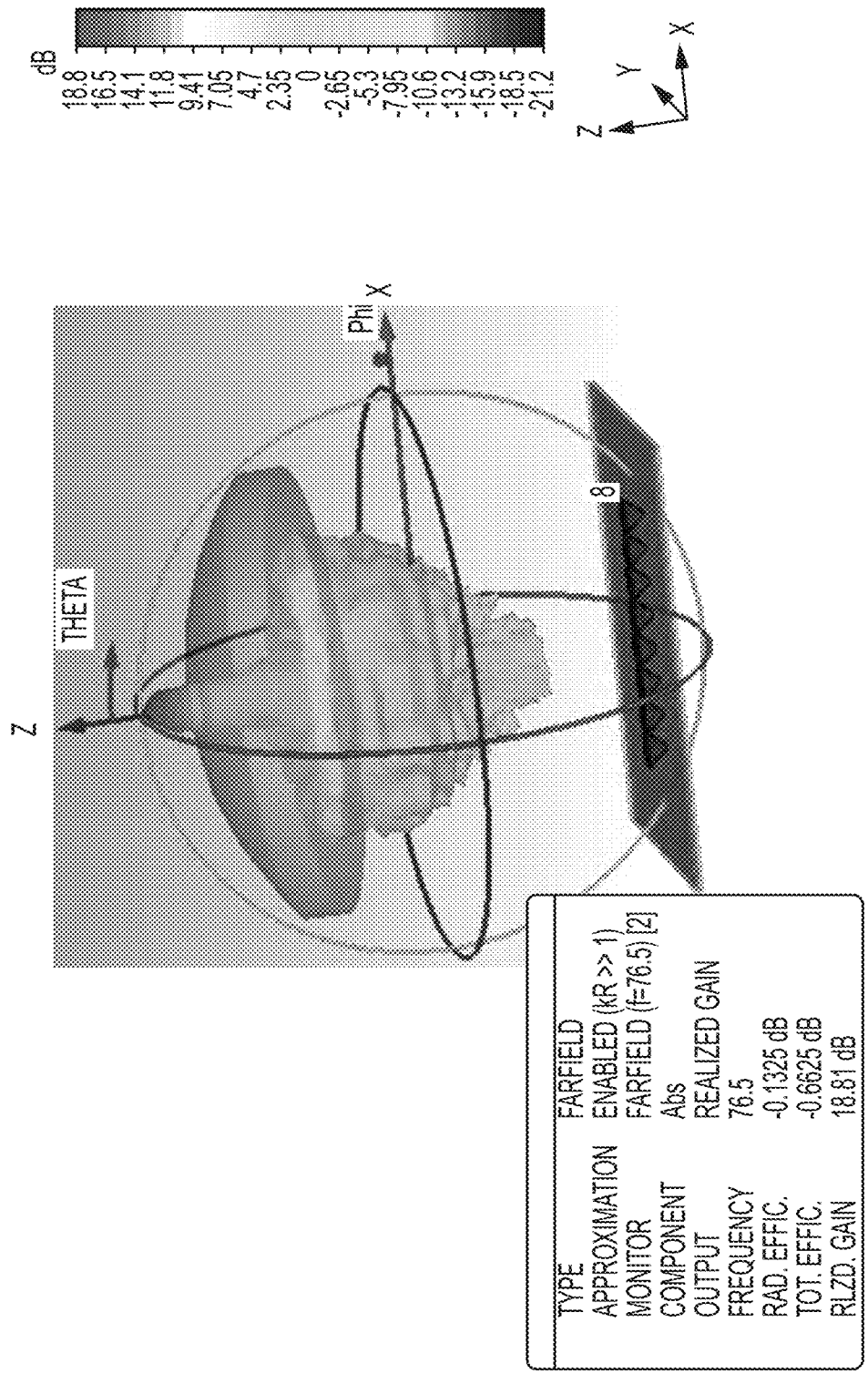
FIG. 20 is a three-dimensional plot of simulated radiation pattern of an antenna element of an antenna system according to the disclosure.

FIG. 20 is a three-dimensional plot of the simulated radiation pattern of second-from-left antenna element 320 (FIG. 3A) of the disclosed system at a frequency of 76.5 GHz. The plot illustrates the magnitude and orientation of the radiation pattern with respect to reference coordinate system 260 (FIG. 2A). Maximum realized gain is 18.81 dB; radiation efficiency is −0.1325 dB; and total efficiency is −0.6625 dB.

Figure 21:
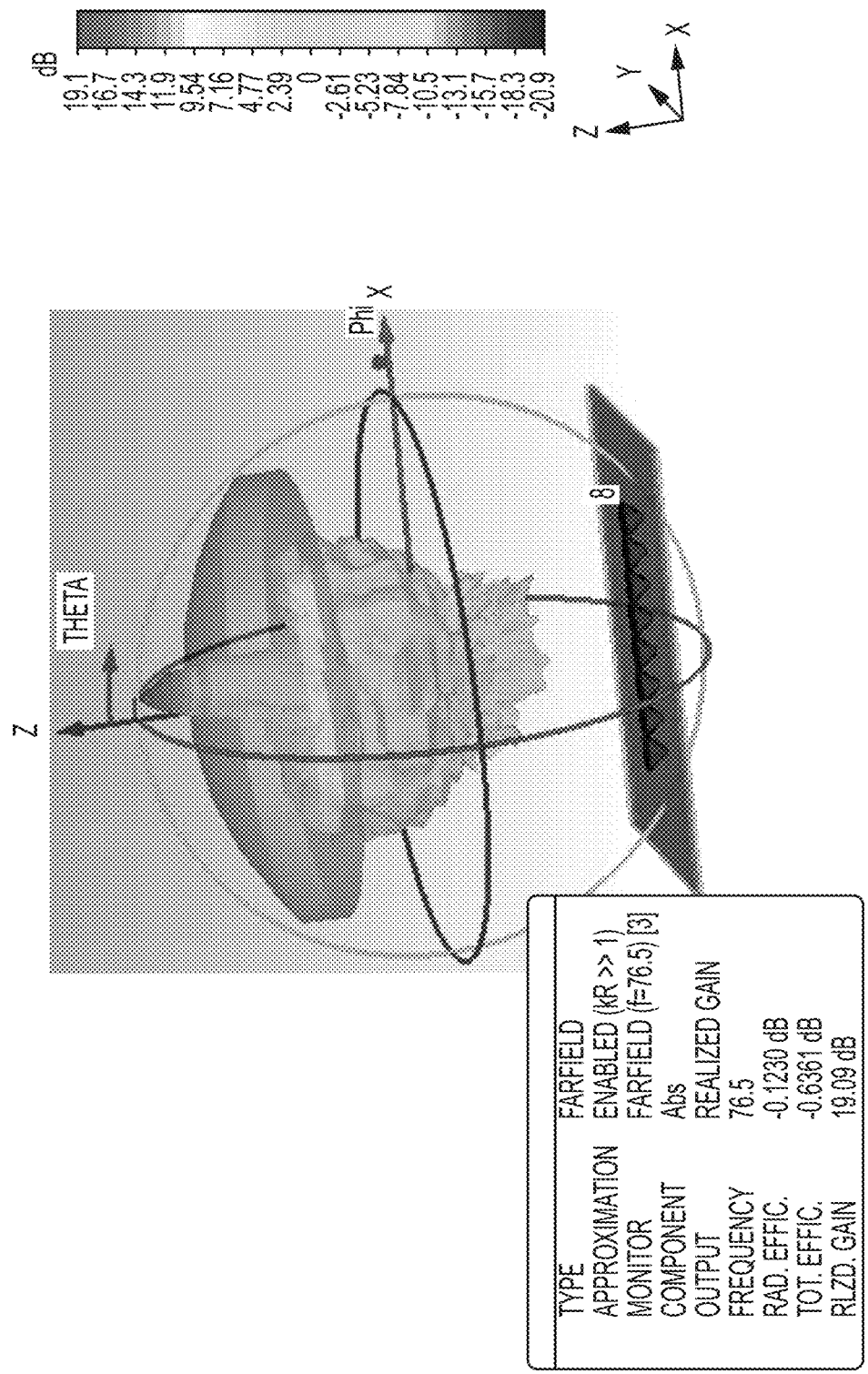
FIG. 21 is a three-dimensional plot of simulated radiation pattern of an antenna element of an antenna system according to the disclosure.

FIG. 21 is a three-dimensional plot of the simulated radiation pattern of third-from-left antenna element 320 (FIG. 3A) of the disclosed system at a frequency of 76.5 GHz. The plot illustrates the magnitude and orientation of the radiation pattern with respect to reference coordinate system 260 (FIG. 2A). Maximum realized gain is 19.09 dB; radiation efficiency is −0.1230 dB; and total efficiency is −0.6361 dB.

Figure 22:
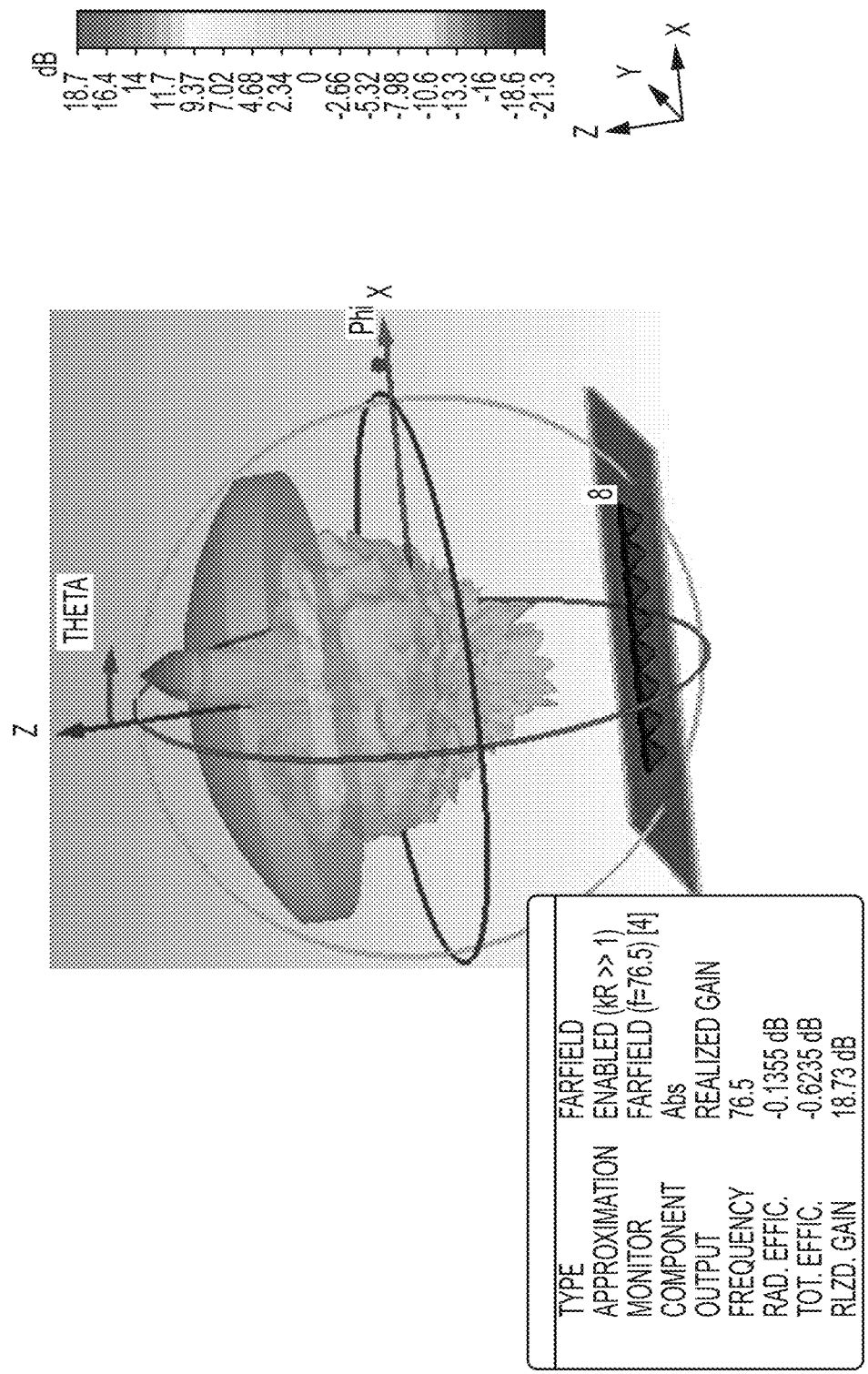
FIG. 22 is a three-dimensional plot of simulated radiation pattern of an antenna element of an antenna system according to the disclosure.

FIG. 22 is a three-dimensional plot of the simulated radiation pattern of fourth-from-left antenna element 320 (FIG. 3A) of the disclosed system at a frequency of 76.5 GHz. The plot illustrates the magnitude and orientation of the radiation pattern with respect to reference coordinate system 260 (FIG. 2A). Maximum realized gain is 18.73 dB; radiation efficiency is −0.1355 dB; and total efficiency is −0.6235 dB.

Figure 23:
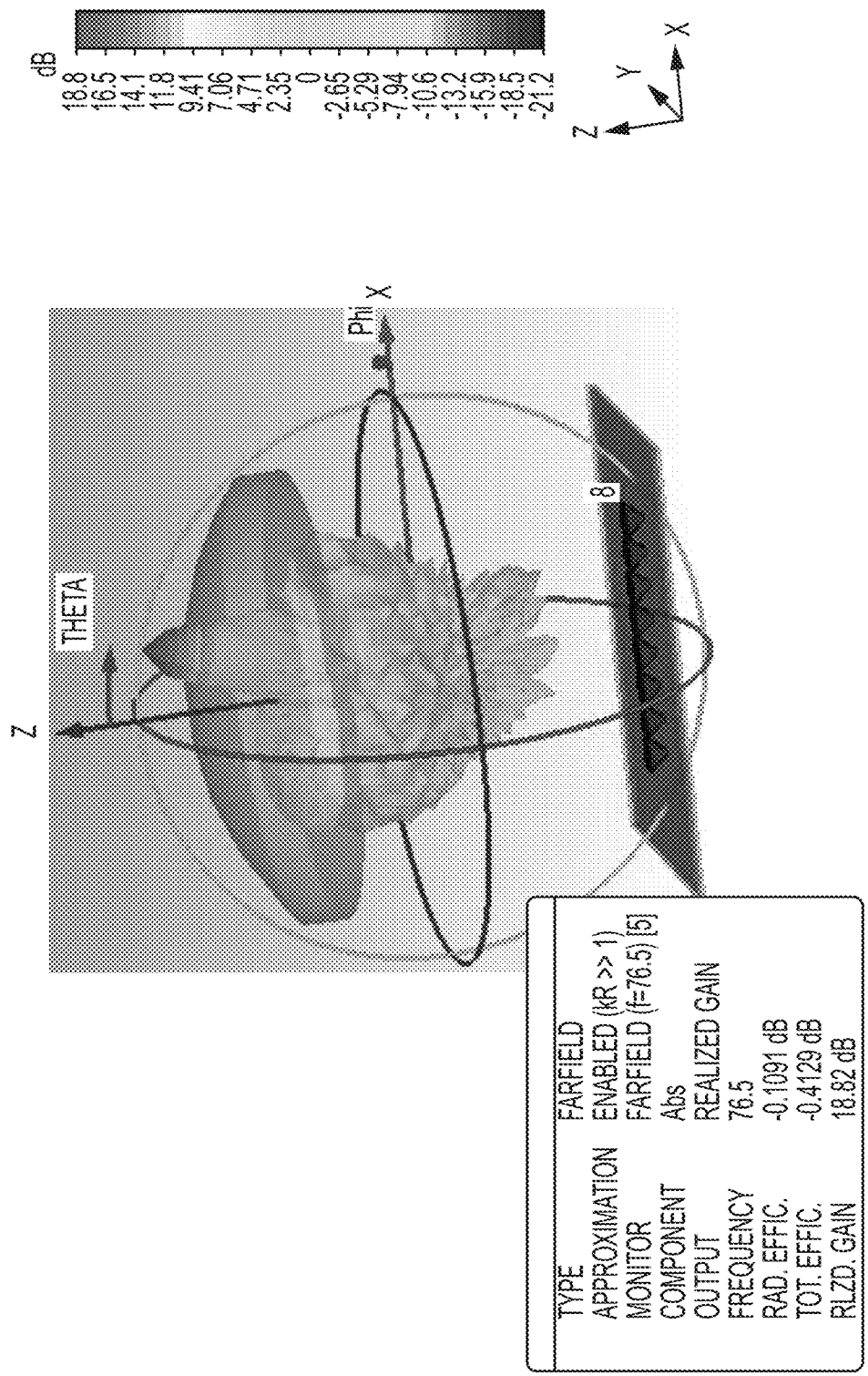
FIG. 23 is a three-dimensional plot of simulated radiation pattern of an antenna element of an antenna system according to the disclosure.

FIG. 23 is a three-dimensional plot of the simulated radiation pattern of fifth-from-left antenna element 320 (FIG. 3A) of the disclosed system at a frequency of 76.5 GHz. The plot illustrates the magnitude and orientation of the radiation pattern with respect to reference coordinate system 260 (FIG. 2A). Maximum realized gain is 18.82 dB; radiation efficiency is −0.1091 dB; and total efficiency is −0.4129 dB.

Figure 24:
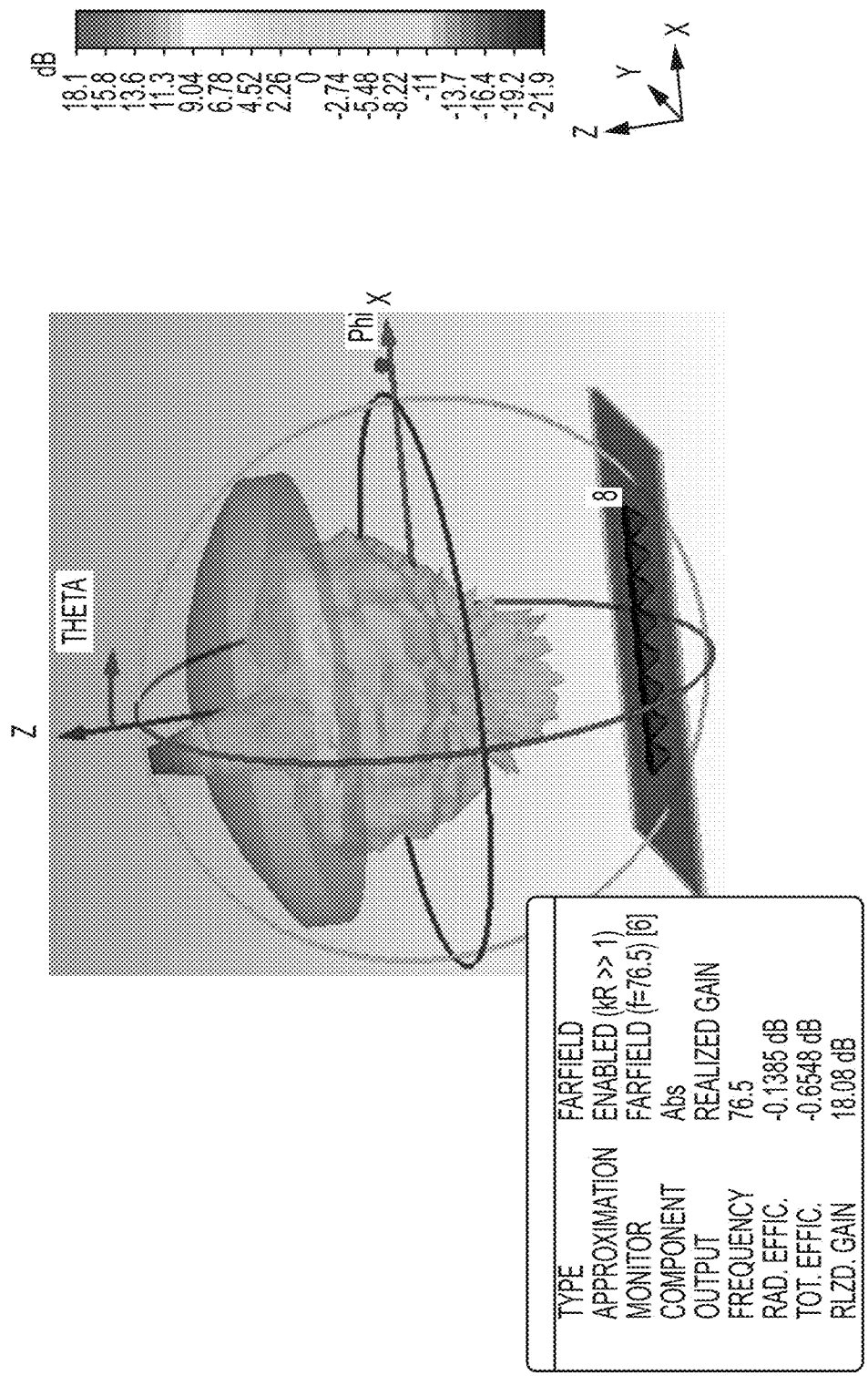
FIG. 24 is a three-dimensional plot of simulated radiation pattern of an antenna element of an antenna system according to the disclosure.

FIG. 24 is a three-dimensional plot of the simulated radiation pattern of sixth-from-left antenna element 320 (FIG. 3A) of the disclosed system at a frequency of 76.5

GHz. The plot illustrates the magnitude and orientation of the radiation pattern with respect to reference coordinate system 260 (FIG. 2A). Maximum realized gain is 18.08 dB; radiation efficiency is −0.1385 dB; and total efficiency is −0.6548 dB.

Figure 25:
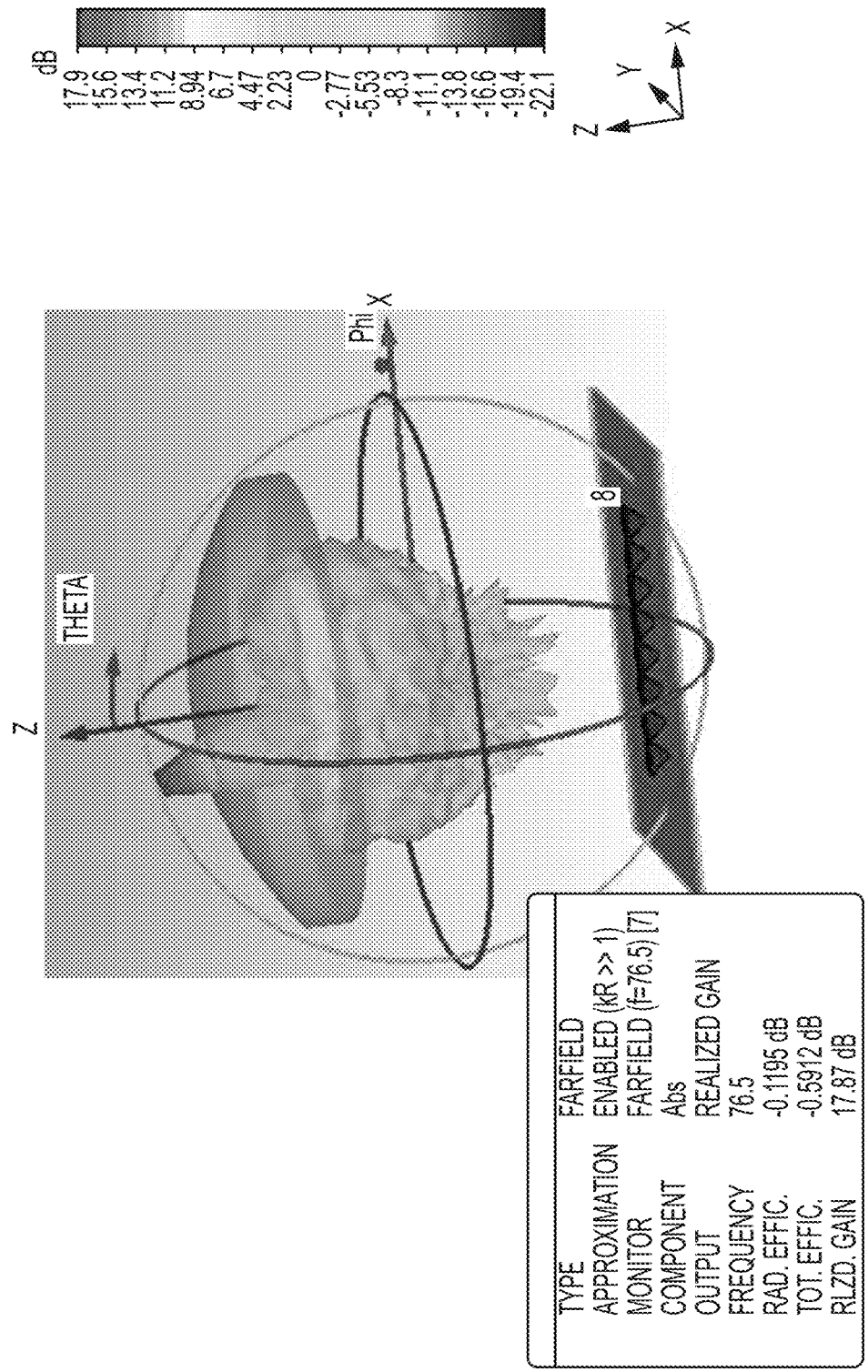
FIG. 25 is a three-dimensional plot of simulated radiation pattern of an antenna element of an antenna system according to the disclosure.

FIG. 25 is a three-dimensional plot of the simulated radiation pattern of seventh-from-left antenna element 320 (FIG. 3A) of the disclosed system at a frequency of 76.5 GHz. The plot illustrates the magnitude and orientation of the radiation pattern with respect to reference coordinate system 260 (FIG. 2A). Maximum realized gain is 17.87 dB; radiation efficiency is −0.1195 dB; and total efficiency is −0.5912 dB.

Figure 26:
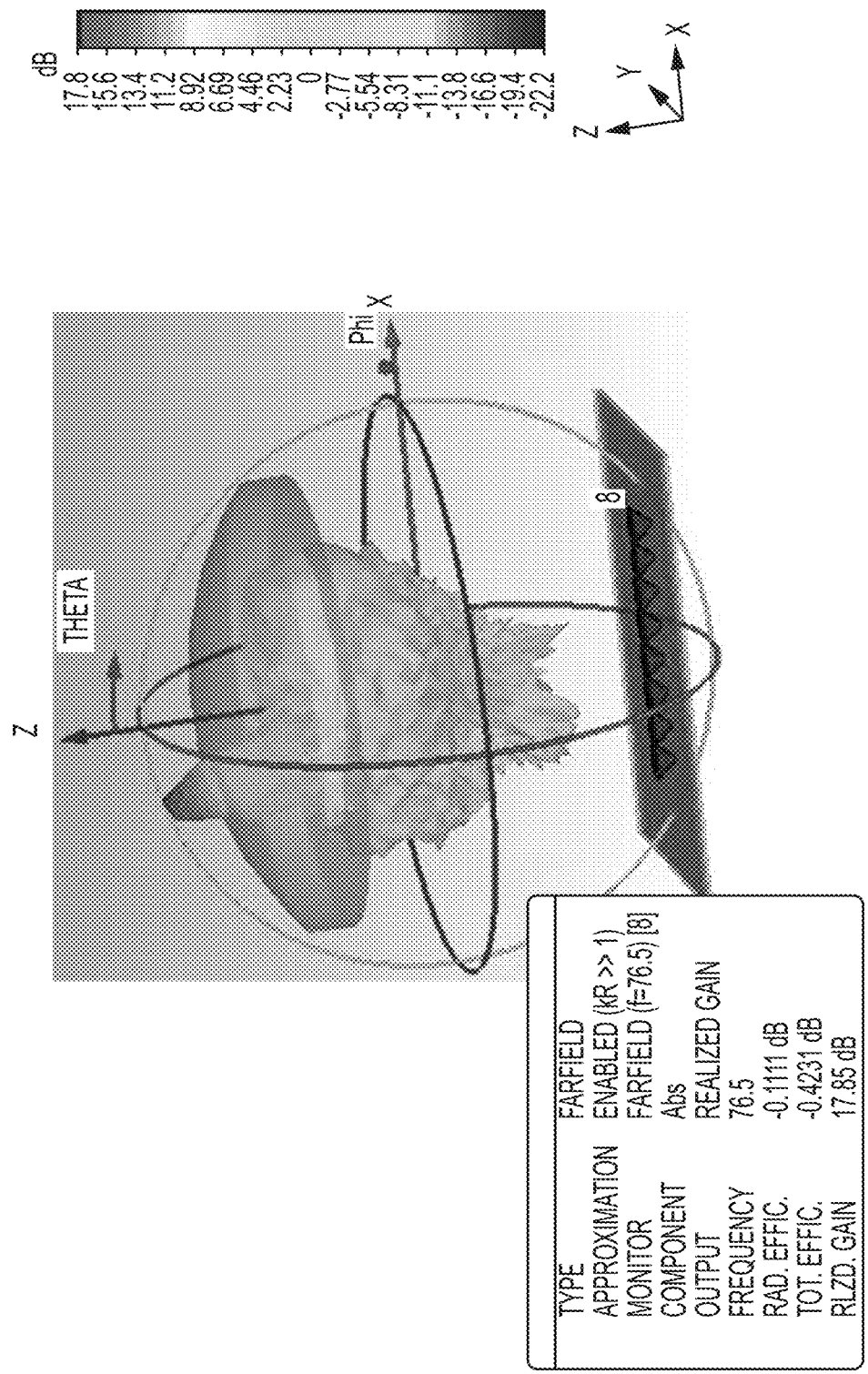
FIG. 26 is a three-dimensional plot of simulated radiation pattern of an antenna element of an antenna system according to the disclosure.

FIG. 26 is a three-dimensional plot of the simulated radiation pattern of second-from-left antenna element 320 (FIG. 3A) of the disclosed system at a frequency of 76.5 GHz. The plot illustrates the magnitude and orientation of the radiation pattern with respect to reference coordinate system 260 (FIG. 2A). Maximum realized gain is 17.85 dB; radiation efficiency is −0.1111 dB; and total efficiency is −0.4231 dB.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. An antenna system comprising:
   a base having an upper surface and a lower surface further comprising an antenna receptacle,
   a support leg extending from an upper surface of the base,
   a lens holder, wherein the support leg positions the lens holder away from the upper surface of the base;
   a lens configurable to concentrate a radiated energy through the lens, wherein the lens is a discrete structure supported by the lens holder; and
   an antenna array positioned in the antenna receptacle below the lens, wherein a space between the lens holder and the base is open to expose a portion of the antenna array to ambient surroundings.

2. The antenna system of claim 1, further comprising one or more additional support legs.

3. The antenna system of claim 1, wherein the support leg cantilevers the lens over the antenna array.

4. The antenna system of claim 1, wherein the lens holder comprises a bevel, the bevel configured to retain the lens within the lens holder.

5. The antenna system of claim 1, wherein the antenna array comprises a plurality of antennas and a plurality of ports.

6. The antenna system of claim 5, wherein the plurality of antenna elements comprise eight antennas.

7. The antenna system of claim 1, wherein the radiated energy is an electromagnetic energy at frequencies of from 75 GHz to 80 GHz.

8. The antenna system of claim 1 wherein radiated energy is concentrated with high side lobe rejection.

9. The antenna system of claim 1 wherein multiple beams with a field view of +/−15 degrees are allowed.

10. The antenna system of claim 1 wherein the base has a shape in two dimensions selected from square, round, rectangular, ovoid, and triangular.

11. The antenna system of claim 1 wherein the lens has a focal distance of about 19 mm from a surface of the antenna array.

12. The antenna system of claim 1, wherein the lens holder comprises a first material, and wherein the lens comprises a second material, the first material different than the second material.

13. The antenna system of claim 1, wherein the lens holder comprises a plurality of prongs, the plurality of prongs configured to retain the lens within the lens holder.

14. A method of concentrating radiated energy comprising:
   providing a base having an upper surface and a lower surface, the base comprising an antenna receptacle,
   providing a support leg extending from an upper surface of the base;
   providing a lens holder supported by the support leg, wherein a space between the lens holder and the base is open to expose a portion of the antenna receptacle to ambient surroundings;
   positioning a lens in the lens holder away from the upper surface of the base, wherein the lens is a discrete structure supported by the lens holder;
   concentrating a radiated energy through the lens.

15. The method of concentrating radiating energy of claim 14, further comprising providing a second support leg extending from the upper surface of the base, the second support leg distinct from the first support leg.

16. The method of concentrating radiating energy of claim 14, wherein the lens holder comprises a bevel, the bevel configured to retain the lens within the lens holder.

17. The method of concentrating radiating energy of claim 14, wherein the antenna array comprises a plurality of antennas and a plurality of ports.

18. The method of concentrating radiating energy of claim 17, wherein the plurality of antenna elements comprise eight antennas.

19. The method of concentrating radiating energy of claim 14, further comprising the step of radiating energy at frequencies of from 75 GHz to 80 GHz.

20. The method of concentrating radiating energy of claim 14 wherein multiple beams with a field view of +/−15 degrees are allowed.

21. The method of concentrating radiating energy of claim 14 wherein radiated energy is concentrated with high side lobe rejection.

22. The method of concentrating radiating energy of claim 14 wherein the base has a shape in two dimensions selected from square, round, rectangular, ovoid, and triangular.

23. The method of concentrating radiating energy of claim 14 wherein the step of positioning the lens in the lens holder away from the receiving surface of the base further comprises positioning the lens with a focal distance of about 19 mm from a surface of the antenna array.

* * * * *